United States Patent
Sur et al.

(10) Patent No.: US 11,169,282 B2
(45) Date of Patent: Nov. 9, 2021

(54) DETECTION APPARATUS AND METHOD

(71) Applicant: Atomic Energy of Canada Limited / Énergie Atomique du Canada Limitée, Chalk River (CA)

(72) Inventors: Bhaskar Sur, Deep River (CA); Gang Li, Deep River (CA); Ghaouti Bentoumi, Petawawa (CA); Liqian Li, Deep River (CA)

(73) Assignee: Atomic Energy of Canada Limited / Énergie Atomique du Canada Limitée, Chalk River (CA)

( * ) Notice: Subject to any disclaimer, the term of this patent is extended or adjusted under 35 U.S.C. 154(b) by 0 days.

(21) Appl. No.: 16/331,240

(22) PCT Filed: Sep. 7, 2017

(86) PCT No.: PCT/CA2017/051048
§ 371 (c)(1),
(2) Date: Mar. 7, 2019

(87) PCT Pub. No.: WO2018/045461
PCT Pub. Date: Mar. 15, 2018

(65) Prior Publication Data
US 2019/0187303 A1    Jun. 20, 2019

Related U.S. Application Data

(60) Provisional application No. 62/384,369, filed on Sep. 7, 2016.

(51) Int. Cl.
*G01T 1/22*    (2006.01)
*G08C 23/04*    (2006.01)
(Continued)

(52) U.S. Cl.
CPC ............... *G01T 1/22* (2013.01); *G01D 21/00* (2013.01); *G01T 1/178* (2013.01); *G01T 1/20* (2013.01);
(Continued)

(58) Field of Classification Search
CPC ........... G01D 21/00; G01T 1/178; G01T 1/20; G01T 1/2002; G01T 1/204; G01T 1/208; G01T 1/22; G08C 23/04; G21C 17/108
See application file for complete search history.

(56) References Cited

U.S. PATENT DOCUMENTS 3,600,578 A * 8/1971 Porges .................. G01T 1/22
                                                                250/389
4,215,274 A * 7/1980 Segall .................. G01T 1/22
                                                                250/361 R
(Continued)

FOREIGN PATENT DOCUMENTS

CA       652184 A    11/1962
CA    2831826 A1    10/2012
(Continued)

OTHER PUBLICATIONS

International Search Report and the Written Opinion dated May 4, 2017 in respect of PCT/CA2017/051048.
(Continued)

*Primary Examiner* — Marcus H Taningco
(74) *Attorney, Agent, or Firm* — Bereskin & Parr LLP/S.E.N.C.R.L., s.r.l.

(57) ABSTRACT

An apparatus for use in making localized passive measurements of electromagnetic radiation emitted from an object located in a radioactive environment includes a hollow elongate conduit having a first end, a second end, and a reflective inner surface. The first end of the conduit is positionable in the radioactive environment proximate the
(Continued)

object, and the second end of the conduit is positionable outside the radioactive environment. The conduit has at least one bend between the first end and the second end, such that light entering the first end of the conduit is reflected by the inner surface of the conduit at least once as it travels through the conduit before reaching the second end. A detector in optical communication with the second end of the conduit is configured to detect electromagnetic radiation that reaches the second end.

19 Claims, 17 Drawing Sheets

(51) Int. Cl.
*G01T 1/20* (2006.01)
*G01D 21/00* (2006.01)
*G01T 1/178* (2006.01)
*G01T 1/204* (2006.01)
*G01T 1/208* (2006.01)
*G21C 17/108* (2006.01)

(52) U.S. Cl.
CPC ............ *G01T 1/2002* (2013.01); *G01T 1/204* (2013.01); *G01T 1/208* (2013.01); *G08C 23/04* (2013.01); *G21C 17/108* (2013.01)

(56) References Cited

U.S. PATENT DOCUMENTS

| | | | | |
|---|---|---|---|---|
| 4,235,670 A * | 11/1980 | Alzaidi | ............... | G21C 17/108 376/255 |
| 4,708,844 A * | 11/1987 | Kearton | ............... | G21C 17/108 376/247 |
| 4,855,718 A * | 8/1989 | Cholin | .................. | G08B 17/12 340/578 |
| 4,913,505 A | 4/1990 | Levy | | |
| 5,006,714 A * | 4/1991 | Attix | ......................... | G01T 1/02 250/252.1 |
| 6,141,476 A | 10/2000 | Matsuura et al. | | |
| 6,527,398 B1 * | 3/2003 | Fetzer | .................... | G01N 21/05 356/437 |
| 2004/0114898 A1 | 6/2004 | Hanson et al. | | |
| 2006/0202627 A1 * | 9/2006 | Dudik | .................... | H01J 61/82 313/634 |
| 2009/0014665 A1 * | 1/2009 | Fleming | ................. | G01T 1/023 250/484.5 |
| 2009/0074348 A1 | 3/2009 | Xia et al. | | |
| 2010/0044571 A1 * | 2/2010 | Miyaoka | .................. | G01T 1/20 250/362 |
| 2011/0024639 A1 * | 2/2011 | Dazeley | .................. | G01T 3/008 250/366 |
| 2012/0307952 A1 * | 12/2012 | Wilson | ..................... | G01T 1/22 376/153 |
| 2014/0021363 A1 * | 1/2014 | Baek | ......................... | G01T 7/04 250/380 |
| 2014/0105346 A1 * | 4/2014 | Ohsaka | ................ | G21C 17/108 376/254 |
| 2014/0293269 A1 | 10/2014 | Gaillot et al. | | |
| 2015/0060686 A1 | 3/2015 | DeVolpi | | |
| 2018/0252825 A1 * | 9/2018 | Benlloch Baviera | ....................... | G01T 1/1642 |

FOREIGN PATENT DOCUMENTS

| | | |
|---|---|---|
| EP | 2423711 A2 | 2/2012 |
| RU | 2113738 C1 | 6/1998 |
| WO | 2015090765 A1 | 6/2015 |

OTHER PUBLICATIONS

Extended European Search Report dated Mar. 26, 2020, in respect of European Patent Application No. 17847849.1.

* cited by examiner

DETECTION APPARATUS AND METHOD

CROSS-REFERENCE TO RELATED APPLICATIONS

This application is a National Stage of International Application No. PCT/CA2017/051048, filed Sep. 7, 2017, which claims the benefit of U.S. Provisional Application No. 62/384,369 filed Sep. 7, 2016 and entitled DETECTION APPARATUS AND METHOD, the entirety of which is incorporated herein by reference.

FIELD

This disclosure relates generally to apparatus and methods for making measurements of objects located in a hazardous environment.

INTRODUCTION

Localized measurements (of, e.g. radiation fields) are often required to be made in environments which have high ambient radiation fields, high temperatures, corrosive atmospheres or other hazards. Examples of the types of high radiation or high hazard areas that are envisaged for such measurements are: in the core or shielding of a nuclear reactor, at or near the reactor face inside the refueling vault of a Pressurized Heavy Water Reactor, inside the containment of a nuclear reactor following an accident, inside irradiated nuclear fuel placed in storage, inside shielded facilities or "hot cells" that contain highly radioactive material or inside specialized enclosures with high temperature, highly toxic or highly corrosive environments.

The objectives of such measurements may include monitoring the local and global fission power and neutron flux in a nuclear reactor; the presence and movement of radioactive material; the decay heat and temperature of irradiated nuclear fuel; process parameters for a hot cell process or for a process in a high temperature, high toxicity, and/or highly corrosive environment, for the purposes of nuclear safety, security, non-proliferation, safeguards as well as for nuclear and non-nuclear process safety and production efficiency.

U.S. Pat. No. 6,141,476 discloses a hollow waveguide that transmits ultraviolet light with low attenuation. The invention comprises a small-diameter, thin-wall, glass tube and a thin aluminum film on the inner surface of the glass tube. The aluminum film is deposited by a chemical vapor deposition method using an organometallic of aluminum as a precursor. The deposition process produces high smoothness of the film surface.

United States Patent Publication No. US 2004/0114898 discloses an optical signal transmission system comprises a metal conduit for transmitting optical signals between an optical signal transmitter and an optical signal receiver. The metal conduit is preferably formed of metal tubing and defines a hollow light channel containing air or other gas through which light propagates. In one aspect, metal conduits are interconnected by a polymeric coupling that transmits light between hollow light channels without loss due to misalignment or gaps between the channels.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Many types of transducers and sensors (a) generate light signals or (b) use light as a probe for measuring physical and/or chemical characteristics. Examples of transducers and sensors that (a) generate light signals include scintillation detectors that convert nuclear radiation energy into ultra-violet (UV) light pulses, wavelength shifters that convert UV light to visible light, and various types of materials and devices that emit light in response to electrical signals, to physical characteristics such as temperature and pressure or to chemical and biological characteristics of materials in their immediate vicinity. Examples of transducers and sensors that (b) use light as a probe include a wide variety of photonic devices such as Bragg grating-based sensors, as well as laser-based devices such as linear and rotary position encoders, Raman and other optical spectroscopy-based chemical probes, proximity sensors, particle sizers and laser rangers.

When light based transducers and sensors are to be used in high radiation fields and other high hazard environments, the devices that (a) detect the response signal—typically a photodiode, phototransistor or photomultiplier tube and the like, or, (b) generate the probe signal—typically a Light Emitting Diode (LED), laser, or an incandescent or a fluorescent lamp and the like, are sometimes located remotely, outside the high radiation or hazardous area as (i) they can be easily damaged or degraded and (ii) such areas are typically difficult to access for the purpose of maintenance, repair or replacement.

Accordingly, a light guide is typically used to transmit the response light signals from, or to deliver the probe light beam to, the measurement location inside the high radiation field or high hazard area to the sensor(s) positioned outside the high hazard area.

Following the development of low loss optical fibres in the 1970's, the use of light guides for nuclear instrumentation purposes has been on the development of radiation resistant optically transparent media. However, using optical fibres made of optically transparent materials, including so-called radiation resistant glasses and ceramics, for guiding light in intense radiation field and other high hazard environments may have one or more challenges and/or disadvantages.

For example, while radiation darkening may occur more slowly in radiation resistant glass formulations (as compared to standard formulations), it is still typically significant over a relatively short time period, often over a period of hours or days in intense radiation fields such as inside a nuclear reactor core. Additionally, radiation darkening typically occurs rapidly at the UV and blue end of the optical spectrum, as compared to the red and infra-red end, which generally leads to a change in the spectral transmission characteristics over time.

Also, glass, ceramics and other insulating materials may become electrically charged in high radiation fields. The subsequent discharge may damage the glass and create transmission losses for light signals irrespective of the spectral characteristics. Also, glass cannot, in general, be used at high temperatures because it becomes soft and because different types of glass have different optical, mechanical, radiation resistance, and chemical resistance properties and the trade-off for use in different types of hazardous environments is generally difficult to make.

In accordance with one aspect of this disclosure, a light guide may be used to transmit the response light signals from, or to deliver the probe light beam to, the measurement location inside the high radiation field or high hazard area. For example, a small-diameter tube having a sufficiently reflective inner surface (e.g. a tube having a polished, metallic inner surface) may be used to guide light, for the purpose of conveying light across a boundary from a sensor to a detector or for the purpose of conveying light from a source to a transducer or device that uses light as a probe, where the sensor or transducer is located on one side of the boundary inside a high radiation field or a high hazard environment, and the light detector or source are located on the other side of the boundary outside the high hazard environment.

To help provide acceptable performance, the light guide may transport light at frequencies over a wide frequency range, optionally ranging from the UV to the visible and near-infrared spectrum and preferably may function reliably and without materially degrading over a useful time period, even if used in a high radiation or other high hazard (such as high temperature, or highly corrosive) environment. Preferably, the light guide may have acceptable transmission losses over the entire applicable range of the spectrum for relatively long distances/lengths. Providing relatively long light guide lengths may help provide access to points relatively far inside the high radiation or high hazard shielding, and may help facilitate transmission of the light over distances of between about 5 m to about 15 m or more.

In accordance with one aspect of the teachings described herein, an apparatus for use in making passive measurements of electromagnetic radiation emitted from an object located in a radioactive environment bounded by a radiation barrier may include a hollow, elongate conduit having a first end extending along a linear first conduit axis, a second end, and a reflective inner surface and extending through the radiation barrier. The first end of the conduit may be positioned on one side of the radiation barrier and within the radioactive environment proximate the object. The second end of the conduit may be positioned on an opposing second side of the radiation barrier and outside the radioactive environment. The conduit may have at least one offset portion located between the first end and the second end and configured such that first conduit axis intersects the inner surface of the conduit at the offset portion whereby light entering the first end of the conduit is reflected by the inner surface of the conduit at least once as it travels through the conduit before reaching the second end and streaming of ionizing radiation particles through the conduit from the first end to the second end is inhibited. A detector may be in optical communication with the second end of the conduit and configured to detect the electromagnetic radiation exiting the second end.

The inner surface of the conduit may have a reflectivity of at least 0.85, and the reflectivity of the inner surface of the conduit may be at least 0.95.

The inner surface of the conduit may have a surface roughness of 15 μin Ra or less.

The surface roughness of the inner surface of the conduit may be about 10 μin Ra.

The conduit may be formed from metal, or may be formed from a non-metallic material and the inner surface may include a metallic material that has been applied to the non-metallic material.

The conduit may have an inner diameter that is less than 10 mm, and may be between 3.5 and 5.5 mm.

The conduit may pass through an aperture of the radiation barrier.

The at least one bend may be positioned between the first end of the conduit and the radiation barrier or may be positioned within the radiation barrier.

The detector may include a photomultiplier tube.

The detector may be in optical communication with the second end of the conduit via at least one of a fiber optic cable and a mirror.

A gas source may be in fluid communication with the conduit and operable to introduce and remove gas from the hollow interior of the conduit.

The gas source may be operable to introduce at least one of Helium and Carbon Dioxide to the hollow interior of the conduit.

The detector may be configured to detect Cherenkov light.

The object may include a scintillator.

In accordance with another aspect of the teachings described herein, a method for making localized passive measurements of electromagnetic radiation emitted from an object located in a radioactive environment may include the steps of:

a) providing a hollow elongate conduit having a first end, a second end, a reflective inner surface, and at least one bend between the first end and the second end, such that light entering the first end of the conduit is reflected by the inner surface of the conduit at least once as it travels through the conduit before reaching the second end;

b) positioning the first end of the conduit in the radioactive environment proximate the object;

c) positioning the second end of the conduit outside the radioactive environment, d) providing a detector in optical communication with the second end of the conduit; and e) detecting electromagnetic radiation emitted from the object that reaches the second end of the conduit.

The detected electromagnetic radiation may include Cherenkov light.

The object is immersed in a fluid, wherein positioning the first end of the conduit in the radioactive environment proximate the object comprises positioning the first end of the conduit in the fluid. The method may also include:

a) providing a gas source in fluid communication with the conduit and operable to introduce and remove gas from the hollow interior of the conduit; and b) operating the gas source to adjust the volume of gas within the conduit in order to control the level of fluid in the conduit.

The object may include a scintillator, and positioning the first end of the conduit in the radioactive environment proximate the object may include providing the object.

In accordance with another aspect of the teachings described herein, an apparatus for measuring light produced by an object disposed within a hazardous environment hay include a hollow conduit having a reflective inner surface. A first end may be positioned within the hazardous environment to receive light emitted by the object. A second end may be longitudinally spaced apart from the first end and positioned outside the hazardous environment. A sidewall may extend between the first end and the second end and across a boundary of the hazardous environment. The sidewall may include at least one offset portion located between the first end and second end whereby a direct line of sight between the first end and second end is interrupted. A detector may be positioned to detect the light emitted from the second end of the hollow conduit.

The offset portion may be positioned within the hazardous environment.

The boundary may include a radiation barrier to inhibit the escape of ionizing radiation from the hazardous environment. The offset portion may be disposed within the radiation barrier.

The offset portion may inhibit the direct streaming of ionizing radiation particles from the first end to the second end.

The hollow conduit may be formed from metal.

The hollow conduit may be formed from a non-metallic material and the interior surface is provided with a metallic coating that provides the reflective inner surface.

The object may be a radioactive object that produces Cherenkov light.

The object may be a light generator that produces light within the hazardous environment.

The light generator may be a passive, non-electric light generator.

The light generator may include a scintillator that produces light in response to being exposed to ionizing radiation.

The scintillator may include a solid scintillator positioned adjacent the first end.

The scintillator may include a scintillating liquid that is contained within an interior of the hollow conduit.

The first end may include an end cap whereby the first end is fluidly sealed to contain the scintillating liquid.

An outer surface of the hollow conduit may be opaque.

The hazardous environment may be a radioactive environment.

A pressure-regulated gas supply may be fluidly connected to the interior of the hollow conduit and may be operable to selectably pressurize the interior of the hollow conduit.

The reflectivity of the inner surface of the conduit may be at least 0.95.

The inner surface of the conduit may have a surface roughness of 15 μin Ra or less.

The surface roughness of the inner surface of the conduit may be about 10 μin Ra.

The conduit may have an inner diameter that is less than 10 mm and may be between 3.5 and 5.5 mm.

In accordance with another aspect of the teachings described herein a method of indirectly measuring the radioactivity of radioactive material submerged under water within a hazardous environment bounded by a radiation barrier may include:

a) collecting a first quantity of water in the interior of the first end of a hollow light guide conduit, the first end of the light guide conduit being positioned within the hazardous environment and submerged within the water;

b) conveying the Cherenkov light emitted by the first quantity of water through an interior of the light guide conduit and around at least one bend in the light guide conduit from the first end, through the radiation barrier and toward a second end of the light guide conduit that is positioned outside the hazardous environment by reflecting the Cherenkov light off a reflective inner surface of the light guide conduit, the at least one bend interrupting a direct line of sight from the first end to the second end thereby inhibiting the streaming of ionizing radiation particles produced by the radioactive material from the first end to the second end;

c) receiving the Cherenkov light exiting the second end with a detector to detect a first quantity of Cherenkov light; and d) determining a first radiation field strength at a first depth in the water based on the first quantity of Cherenkov light measured by the detector.

The method may include:

collecting a second quantity of water in the interior of the light guide conduit at the first end;

conveying the Cherenkov light emitted by the second quantity of water through the interior of the light guide conduit and around the at least one bend in the light guide conduit from the first end to the second end by reflecting the Cherenkov light off the reflective inner surface of the light guide conduit;

receiving the Cherenkov light exiting the second end with the detector to detect a second quantity of Cherenkov light; and determining a second radiation field strength at a second depth in the water based on the second quantity of Cherenkov light measured by the detector.

The method may include comparing the first radioactivity to the second radioactivity.

The method may include selectively pressurizing the interior of the light guide conduit at first and second gas pressures to adjust the quantity of water collected within the light guide conduit between the first and second quantities.

The method may include closing an end cap to cover the first end of the light guide conduit after step a), whereby the first quantity of water within the light guide conduit is isolated from water surrounding first end of the light guide conduit so that Cherenkov light emitted by the water surrounding the exterior of the first end of the light guide conduit is blocked from entering the light guide conduit.

The method may include:

collecting a third quantity of water in the interior of the light guide conduit at the first end;

conveying the Cherenkov light emitted by the third quantity of water through the interior of the light guide conduit and around the at least one bend in the light guide conduit from the first end to the second end by reflecting the Cherenkov light off the reflective inner surface of the light guide conduit;

receiving the Cherenkov light exiting the second end with the detector to detect a third quantity of Cherenkov light; and determining a third radiation field strength at a third depth in the water based on the third quantity of Cherenkov light measured by the detector.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
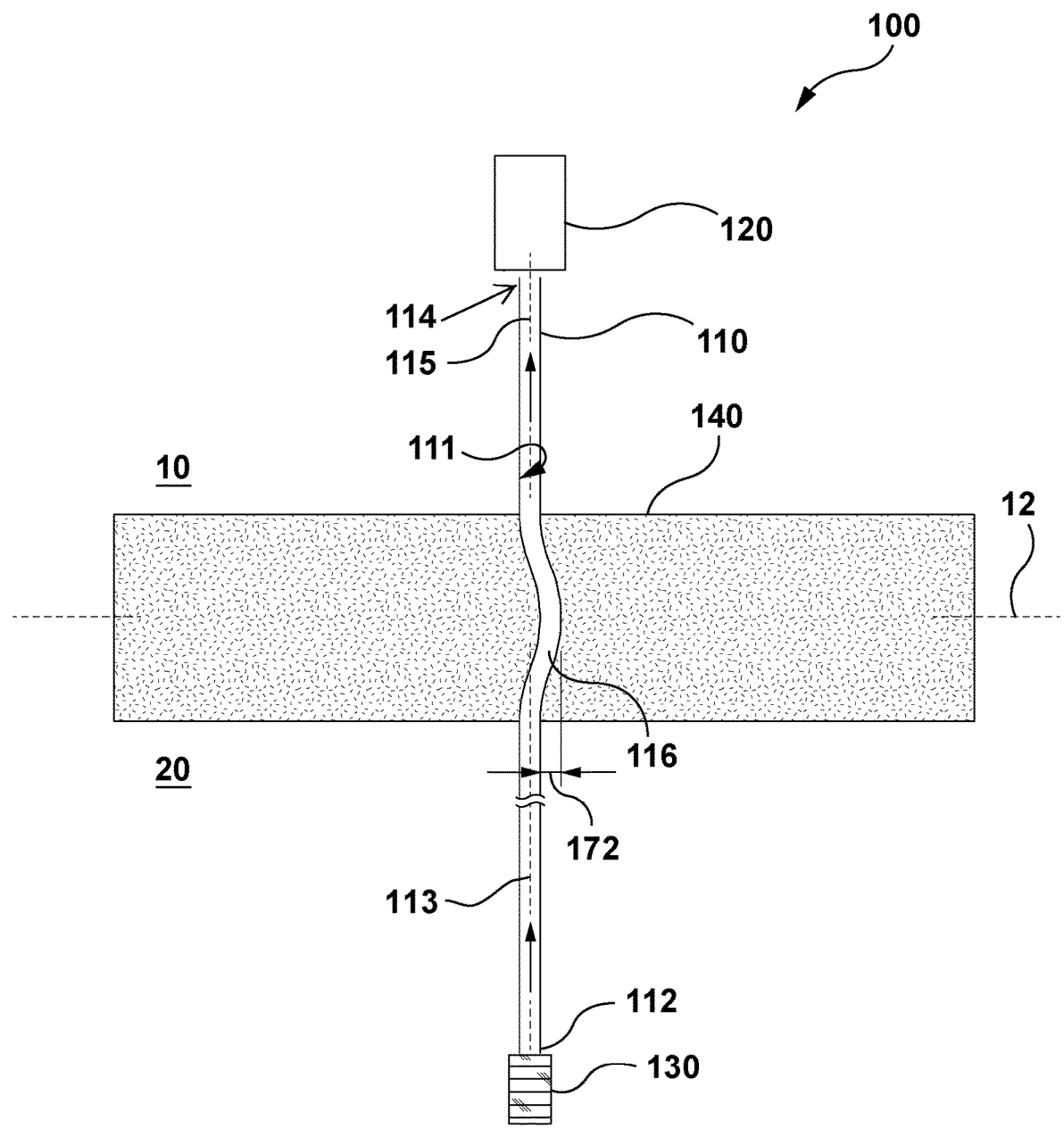
FIG. 1 is a schematic view of one example of a detection apparatus.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

In the examples discussed herein, the hazardous environment in which the apparatus is used is a radioactive environment. In alternative embodiments, the apparatus may be used in another type of hazardous environment, such as a chemically contaminated environment (e.g. a caustic environment), a high temperature environment, and the like. The range of transmission and detection efficiencies covered by the proposed system are expected to be suitable for applications in high temperature environments, corrosive atmospheres, or other hazardous environments.

General Description of a Light Guide

Following the development of low loss optical fibres in the 1970's, the focus of using light guides for nuclear instrumentation purposes has been on the development of radiation resistant optically transparent media. There are a number of scientific publications that report on the efficacy of different glass or transparent ceramics formulations for optical signal transmission in high radiation fields such as inside the cores of nuclear reactors. These radiation resistant glass formulations are typically obtained by the addition of heavy metals and rare earths to the melt from which the glass fibre is drawn.

Using optical fibres made of optically transparent materials, including so-called radiation resistant glasses and ceramics, for guiding light in intense radiation field and other high hazard environments may have one or more challenges and/or disadvantages.

For example, the light transmission of all known transparent solid materials degrades over time, particularly in intense radiation environments. This effect is commonly known as "radiation darkening". Radiation darkening occurs more slowly in radiation resistant glass formulations but is still significant over a period of hours or days in the most intense radiation fields such as inside a nuclear reactor core such that it significantly impedes or inhibits the materials ability to transmit light. Additionally, radiation darkening tends to occur more rapidly at the UV and blue end of the spectrum as compared to the red and infra-red end. This can lead to a change in the spectral transmission characteristics of the material over time which can affect light transmission quality and accuracy.

Also, glass, ceramics and other insulating materials may become electrically charged in high radiation fields. The subsequent discharge may damage the glass and create transmission losses for light signals irrespective of the spectral characteristics. Such transmission losses also can be expected to increase as the amount of exposure to the radioactive environment increases.

Also, glass cannot, in general, be used at temperatures above a few hundred degrees Celsius (such as between about 150 C and about 1200 C depending on composition) because it tends to soften. Different types of glass have different optical, mechanical, radiation resistance and chemical resistance properties and the trade-off for use in different types of hazardous environments is generally difficult to make.

As disclosed herein, rather than using a radiation resistant glass and/or ceramic fiber or other transparent, solid material, a small-diameter hollow conduit with a highly-reflective inner surface can be used to guide light, for the purpose of conveying light from across a boundary between a hazardous area and a non-hazardous area. For example, the light guide can be used to convey light from a sensor to a detector or for the purpose of conveying light from a source to a transducer or device that uses light as a probe, where the sensor or transducer is located inside a high radiation field or a high hazard environment, and the light detector or source is located outside the high hazard environment.

This concept uses reflection from highly reflective (optionally metallic) surfaces to transmit light inside a hollow guide. This is different from optical fibre light guides, or other solid, light transmitting materials which use total internal reflection as a result of refraction.

Using a hollow conduit with a reflective inner surface to guide light in intense radiation field and other high hazard environments may have one or more advantages over the use of optical fibres made of optically transparent materials.

For example, the reflectivity of metallic surfaces (e.g. a metallic inner surface of a hollow conduit) is expected to degrade relatively slowly in high radiation fields, as opposed to, for example the rate of radiation darkening that can affect light transmission inside said optical fibres.

Additionally, the reflectivity of metallic conduits is not expected to change significantly over a wide range of temperatures and pressures, which may be the case for light transmission inside solid optical fibres.

Also, the reflectivity of metal (e.g. a metallic inner surface) is largely independent of the wavelength of light containing the surface, particularly in the Ultraviolet (UV) to near-infrared region. This can be contrasted with transmission inside solid optical fibres, which are typically optimized to convey for narrow wavelength bands.

Qualitative and quantitative experimentation and/or simulation indicates that metal conduits with highly reflective inner surfaces will adequately transport light at frequencies ranging from the UV to the visible and with acceptable transmission losses over distances that will typically allow access to points inside a high radiation or high hazard shielding environment. For example, light guides as disclosed herein are expected to have acceptable transmission losses over distances of up to 15 m or more, and more specifically may be sized to have a length in the range of between about 5 m to about 15 m or more. Conduits with lengths less than 5 m, for example between 0.1 m and 4.5 m may also be useful in certain situations.

It is expected, based on prior experience, that such a metallic light guide will also function predictably and usefully at near-infra-red frequencies in addition to UV frequencies, and will function reliably and without materially degrading over time in a high radiation or other high hazard (such as high temperature, or highly corrosive) environment.

For example, small bore metallic conduits with optical quality inner surfaces suitable for use as a light guide in one or more embodiments disclosed herein is commercially available. Examples of commercially available conduits that was reviewed and found to provide acceptable performance for use as a light guide include: Nickel conduits made using Chemical Vapor Deposition (CVD); Nickel conduits made by electroforming and/or electroplating; and Stainless Steel conduits manufactured with ultra-high polished inner surfaces. Other metal conduits (or tubing with a metallic inner surface) having suitable optical, relative properties may be used in alternative embodiments. For example, Aluminium is another promising material for use as a light guide in a nuclear reactor core (or other high-radiation environments) due to its high optical reflectivity and small neutron interaction cross section, which may help reduce disturbances in the reactor core.

As described further below, both analytical and numerical models to predict the transmission efficiency of light in highly polished small bore light guides were developed. More specifically, experimentation and simulation was conducted to demonstrate the feasibility of detecting Cherenkov light transmitted through a small-diameter highly-reflective metallic tube. The validated models can be used to design light guides for use in high radiation fields or other high hazard environments.

For example, the light transmission characteristics of highly reflective small bore metallic light guides were found to be consistent with total reflection efficiencies of >95%.

Additionally, and surprisingly, light transmission as a function of length of small bore metallic tubes was found to vary less rapidly than the fall-off caused by absorption (which is typically exponential). For example, for a 4.6 mm inner diameter ultra-high polish stainless steel tubing, the light transmission varies as $(\text{Length})^{-1.127}$. In a practical situation, this implies that if the length of the light guide were doubled, the transmission will decrease by approximately 40%.

Referring to FIG. 1, an apparatus for detecting light emitted from an object located in a hazardous environment is shown generally as 100. The apparatus includes a hollow light guide 110 having a first end 112 and a second end 114 that are located on opposite sides of a boundary 12 separating a hazardous environment 20 from a practically less or non-hazardous environment 10. The boundary 12 may be a solid object, or may be a non-solid boundary that indicates the practical transition of environmental conditions from hazardous to practically non-hazardous (such as a distance that is far enough from a hazardous source for the potentially harmful conditions to have lessened/diffused).

The conduit 110 has an outer surface 109 and an opposing inner surface 111, which is preferably reflective. In this example, the first end 112 of the light guide 110 is open and is positioned in the hazardous environment 20 and a physical barrier 140 helps form the boundary 12. The light guide 110 extends through the physical barrier 140 into the non-hazardous environment 10, where the second end 114 of the light guide 110 is positioned. It will be appreciated that barrier 140 may be any physical structure which may help segregate the hazardous environment 20 from the non-hazardous environment 10. For example, if the hazardous environment 20 is radioactive, barrier 140 may comprise lead or other radiation shielding material sufficient to help minimize or prohibit ionizing radiation from entering the non-hazardous environment 10.

By using hollow light guide 110 to passively convey light to a light detector outside the hazardous environment 20, there may not be a need to position active detection element that can be degraded by the intense radiation environment where the radiation field strength is being measured. This may have one or more advantages over other localized detectors. For example, the system performance may not be affected by radiation over time as significantly, or at all.

In the illustrated examples, light guide 110 is a hollow tube or conduit with a reflective inner surface. As discussed above, the use of reflection from highly reflective surfaces to transmit light inside the light guide is different from the use of optical fibres, which use total internal reflection as a result of refraction. The reflectivity of metallic tubes can be persistent in high radiation field environments can be generally constant over a wide range of temperatures and pressures, and can be largely independent of the wavelength of light being reflected especially in the spectrum ranging from UV to near-infrared region.

Light guide 110 preferably includes a conduit made of metal. For example, tubing made of stainless steel with a polished inner surface has been shown to provide sufficient light transmission. It will be appreciated that other metal tubing having suitable optical properties may be used in alternative embodiments. Alternatively, non-metallic tubing with a suitably reflective inner surface may provide sufficient light transmission. For example a plastic or glass conduit with a metallic inner surface coating/liner may be used instead of a metal conduit.

Optionally, the light guide 110 may be a generally straight, linear conduit that extends along a generally linear conduit axis. This may be suitable in certain types of hazardous environments. In such a configuration, there can be a direct line of sight, from the first end 112 to the second end 114. That is, the linear conduit axis can extend from the first end 112 to the second end 114 without intersecting the inner surface 111. Providing a generally linear light guide may help increase the efficiency of the light transmission from the first end 112 to the second end 114. Alternatively, the light guide 110 may be non-linear, such that at least a portion of the conduit is laterally offset from a linear conduit axis. In such a configuration, a first portion of the conduit 110 may extend from the first end 112 along a liner conduit axis and an intermediate portion of the conduit may be offset such that the conduit axis intersects the inner surface of the conduit. In this configuration, the intermediate portion of the conduit interrupts the direct line of sight between the first end 112 and the second end 114. It has been discovered that such a configuration can still transmit an adequate portion of the light from the first end 112 to the second end 114, while helping to inhibit the transfer of other particles between the ends 112, and 114. For example, if the light guide 110 is used in association with a radioactive environment, eliminating a direct line of sight from the first end 112 to the second end 114 may help reduce the transmission of ionizing radiation particles through the light guide 110.

As illustrated in FIG. 1, a first portion of the light guide 110 adjacent the first end 112 extends along a linear conduit axis 113, and a second portion of the light guide, 110, adjacent the second end 114, extends along a linear conduit axis 115. In the illustrated arrangement, the axes 113 and 115 are co-axial, but alternatively may be parallel but non-co-axial, or need not be parallel to each other. In this example, an intermediate portion 116 of light guide 110 is laterally offset from the ends 112 and 114, such that the axes 113 and 115 intersect the inner surface 111 of the light guide 110. By providing an offset, which may be characterized as a bend, curve, or a deviation, there may not be a straight line of sight from the first end 112 to the second end 114. In other words, that light entering the first end 112 of the conduit will be reflected by the inner surface 111 of the conduit at least once as it travels through the light guide 110 before reaching the second end 114. Providing a slight curvature or displacement of the light guide 110 may be desirable (or in some cases, required), e.g. to prevent direct radiation streaming from the hazardous environment 20 to the non-hazardous environment 10. For example, if the light guide 110 is used in association with a radioactive, hazardous environment it can preferably be configured so that any straight line from the radiatioactive hazardous environment 20 to the non-radioactive, non-hazardous environment 10 will pass through a sufficient amount of the radiation shielding material in the barrier 140 (optionally including lead) so as to attenuate the gamma and/or other radiation travelling through the to an acceptable level. The relative size of the barrier 140, the diameter and curvature of the intermediate portion 116 of the light guide 110 and the relative position of the bend/curve within the barrier 140 may be selected to help prevent radiation leakage via the light guide 110. For example, when used in association with a radioactive hazardous environment 20, the light guide 110 and barrier 140 may be configured so that projections of the conduit axes 113 and 115 pass through a sufficient, shielding length of the radiation shielding material forming the barrier 140 so as to attenuate a desired amount of the radiation particles travelling through the light guide 110. That is, at least a portion of the barrier material can be positioned axially between the first and second ends 112 and 114 of the light guide 110.

In the example illustrated in FIG. 1, the bend or offset portion 116 of light guide 110 is positioned within the barrier 140. This arrangement may be useful to minimize or prohibit ionizing radiation particles from bypassing part or all of the thickness of the barrier 140. Alternatively, if the hazardous area 20 is not radioactive, and/or if limiting the escape of radiation particles is of less concern, the bend 116 may be provided on either side of the barrier 140. It will be appreciated that more than one bend or offset may be provided between the first end 112 and second end 114, depending on e.g. the geometry of barrier 140.

In this example, the light that is to be conveyed via the light guide 110 is emitted from a light source within the hazardous area 20. Optionally, the light source may be light that is directly generated/emitted by an object within the hazardous area, such as Cherenkov light, or may be light that is indirectly generated such as by a suitable light generator within the hazardous environment 20. For example, a light generator for use in a radioactive environment may be configured to be a non-electric light generator, such as a scintillator. A suitable scintillator may produce light in response to ionizing radiation, and configuring it as a non-electric light generator may help improve the lifespan of the generator (as electrical components may tend to be degraded by the ionizing radiation).

In the example of FIG. 1, the first end 112 of light guide 110 is optically coupled to a scintillator 130. In this configuration, when scintillator 130 is excited by ionizing radiation, some or all of the light emitted from scintillator 130 will be conducted through the light guide 110 to the second end 114 positioned outside the hazardous environment 20, where it may be detected a suitable light detector 120. The light detector 120 used may be one that is appropriate for detecting the target type of light, but that may be too fragile to be positioned within the hazardous environment 20 directly.

Scintillator 130 may comprise any suitable scintillation material, and may be selected based on the desired radiation to be measured. Examples of suitable scintillators include: inorganic scintillators such as Zinc sulphide (silver activated) ZnS(Ag); sodium Iodide (Thallium activated), NaI (TI); Cesium iodide CsI; and organic scintillators in a polyvinyl toluene or styrene base, often called plastic scintillators; or in a liquid base such as linear alkyl benzene, mineral oil or water, often called "liquid scintillators".

In some embodiments, a scintillator 130 may not be provided. In such arrangements, light from a source within the hazardous environment 20 may be guided to a position outside the hazardous environment by light guide 110. For example, the end 112 of conduit 110 may be positioned proximate a radiant, light emitting object, enabling the collection of emitted light from a precise, known position relative to the radiant object.

In the example illustrated in FIG. 1, light detector 120 is optically coupled to the second end 114 of light guide 110. In this arrangement, light that has traveled through the light guide 110 from the first end 112 may be detected using equipment positioned in the non-hazardous environment 10.

Light detector 120 may comprise any suitable equipment for detecting visible light, and may be selected based on the wavelength and/or expected radiant energy of the light to be detected. Examples of suitable detectors include Photomultiplier tubes, solid state devices including avalanche photodiodes, CMOS based devices such as Silicon photomultipliers, PIN and other types of photodiodes, photo-transistors and the like.

Figure 2:
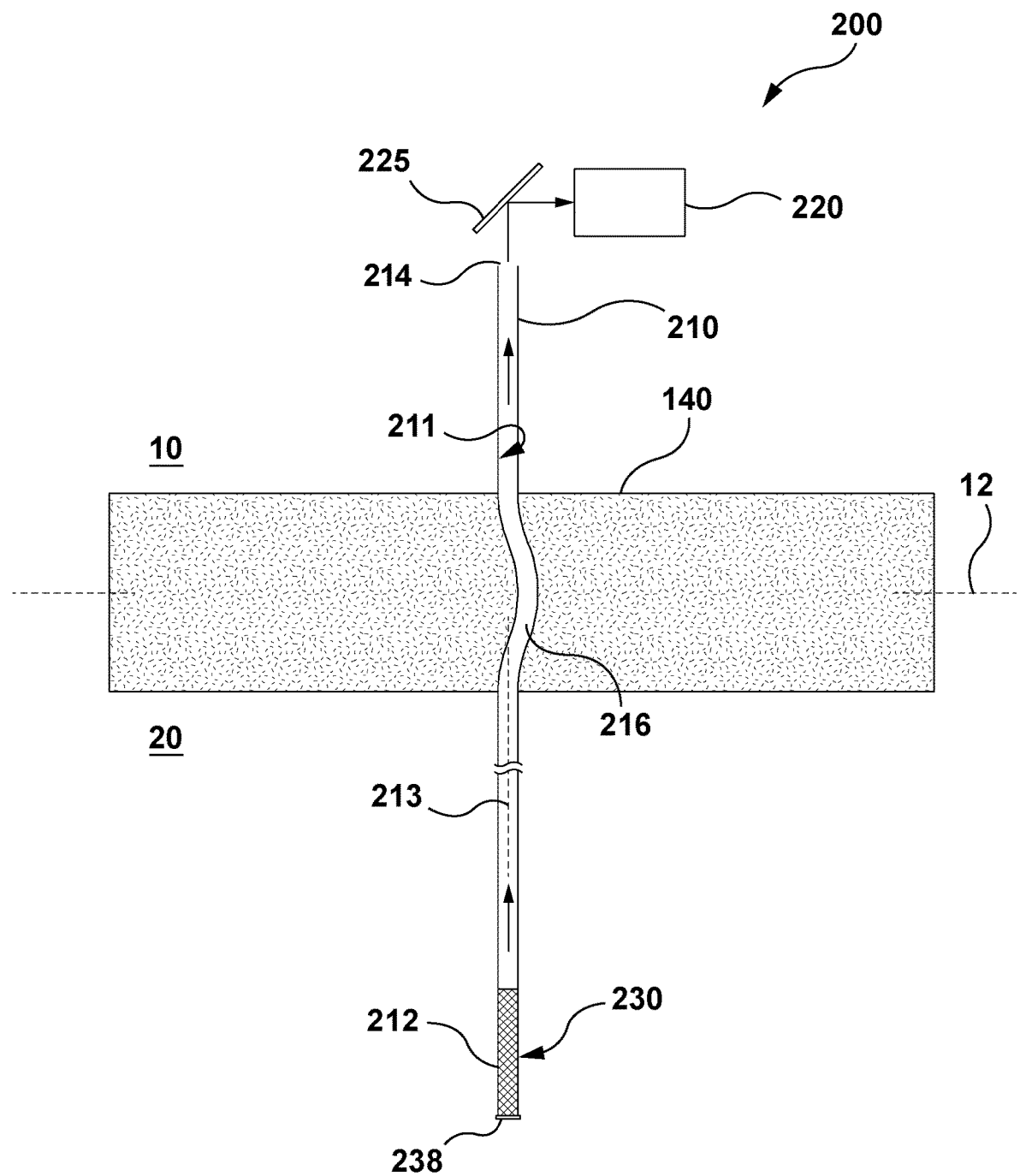
FIG. 2 is a schematic view of another example of a detection apparatus.

Referring to FIG. 2, an alternative apparatus for detecting light emitted from an object located in a hazardous environment is shown generally as 200. Components similar to those in apparatus 100 have been numbered using analogous reference characters indexed by 100.

As shown in FIG. 2, the first end 212 of light guide 210 is closed and is filled with a liquid scintillator 230. Scintillator 230 may comprise any suitable scintillation material, and may be selected based on the desired radiation to be measured. For example, liquid scintillator 230 may comprise a neutron-sensitive scintillator, such as boron-loaded Linear Alkyl Benzene (B-LAB), boron-loaded liquid scintillator EJ-339 and gadolinium-loaded liquid scintillator EJ-331 from the company Eljen Technology; BC-501, BC-501A and BC-519 liquid scintillators from the company Saint-Gobain.

An end seal 238 is provided to seal the first end 212 of light guide 210 to retain the liquid scintillator 238 within the light guide. End seal 238 may be made of any suitable material, and optionally may be provided with a reflective or mirrored surface facing the liquid scintillator 230, in order to increase the amount of scintillated light that is directed towards the second end 214 of the light guide.

In the example illustrated in FIG. 2, light detector 220 is optically coupled to the second end 213 of light guide 210 via a mirror 225. In this arrangement, light that has traveled through the light guide 210 from the first end 212 exits the second end 214, and is reflected by the surface of mirror 225 towards the light detector 220. It will be appreciated that other suitable arrangements for optically coupling the light guide 210 to the light detector 220 may be used, e.g. running one or more optical fibers from the second end 214 of light guide 210 to light detector 220.

The apparatuses 100 and 200 can be generally referred to as passive measurement apparatuses, as they do not require an external power source or electrical equipment to generate and/or transmit the light through the light guide 110, 210. The detectors 120, 220 may be electronic, but the light generators (i.e. scintillators 130, 230) are non-electric and resistant to the hazardous conditions. Optionally, the apparatus 100 or 200 can be provided with active, i.e. powered, light generators if such generators are suitable in a given hazardous environment. For example, an electrical light generator may be useable in some high temperature environments if adequately thermally shielded, etc.

Cherenkov Light

When a charged particle moves in a dielectric medium at a speed faster than the speed of light in that medium, it emits electromagnetic radiation, known as Cherenkov light (P. Cherenkov, Doklady Akademii Nauk SSSR 2, 451 (1934).)

The condition for Cherenkov effect can be expressed as:

$$\beta = \frac{v}{c} > \frac{1}{n} \quad (1)$$

where v is the velocity of the charged particle, c is the speed of light, and n is index of refraction.

The characteristic blue glow in a pool type nuclear reactor is caused by Cherenkov light W. H. Jordan, Scientific American 185, 54 (1951). The Cherenkov light in pool type reactors are mainly generated by high energy electrons, produced by the Compton scattering of gamma rays. Prompt gamma rays originate from the fission process; therefore in principle reactor fission power is linearly related to the Cherenkov light intensity. Monitoring reactor power through Cherenkov light has been an active research subject for decades (J. L. Lovvorn, IRE Transactions on Nuclear Science 8, 3 (1961); M. Arkani and M. Gharib, Annals of Nuclear Energy 36, 896 (2009), but detecting the local Cherenkov intensity in a reactor pool is challenging because of the high radiation environment. Optical fibers have been investigated for transmitting the Cherenkov light in high radiation conditions (Arkani and Gharib, 2009; T. Kakuta, H. Yamagishi, H. Itoh, T. Shikama, and M. Urakami, in *7th International Conference on Nuclear Engineering* (Japan Society of Mechanical Engineers, Tokyo, Japan, 1999). However, optical fibers suffer from loss of transmitted intensity, especially in the UV region, because of radiation-induced darkening.

As demonstrated herein, transmitting Cherenkov light through a small bore, highly reflective tube (e.g. a metallic conduit) may provide one or more advantages over known measuring systems. The transmissions of Cherenkov light through tubes of various lengths were measured and optical properties of the tube were derived from the measured results. This experimentation and/or simulation revealed promising prospects for using a metallic tube to monitor the Cherenkov light generated in reactors or spent fuel pools.

General Description of a Passive Device for Spatial Mapping of Radiation Field Strength in an Intense Nuclear Radiation Environment Using Cherenkov Light It may be considered desirable to have diverse means for localized measurements of beta and gamma radiation emanating from intensely radioactive objects. For example, for the purpose of monitoring fission power distribution in a pool-type reactor core, or for verifying the radiation field strength surrounding of highly radioactive used fuel stored underwater or in shielded containers.

Currently there are a number of detection devices and techniques that are used for these types of measurements. For example, for the intense radiation generated by operating (critical) reactors, in-core flux detectors may be used to detect neutrons, gamma radiation, or mixed neutron and gamma radiation fields at the location of their active elements. For less intense radiation, such as that which is generated by spent nuclear fuel, a variety of nuclear detectors located close to the radioactive source may be used. Such detectors include ion chambers, fission chambers, solid-state diode detectors, and scintillator detectors.

For spent nuclear fuel stored underwater, imaging detectors, such as CNL's Cherenkov viewing device (see for example: Vinicius N. P. ANGHEL, James Johnston, Bhaskar Sur, Toban VERDUN; "Quantitative Cerenkov radiation viewing methods and systems", Patent #CA2831826 A1, Publication date Oct. 4, 2012 and references therein, can be used to view the Cherenkov light caused by the interaction of radiation with water.

While such a Cherenkov imaging detector may be effective for remotely viewing fuel under still water, it typically requires controlled ambient lighting, may be affected by impurities and movement (ripples) in the water, and may not be able to resolve depth information as precisely as one may desire.

Also, other known detection devices and methods may have one or more disadvantages. For example, active elements of most types of nuclear radiation detectors undergo radiation damage and degradation when used in such intense radiation fields. For example, solid state diodes are extremely vulnerable to neutron fields, aside from the issues of electrical cables and connector degradation in high radiation fields. Also, scintillator elements and the device that converts scintillation light to an electrical signal both degrade rapidly in high radiation fields. Further, while fibre-optic cables may be employed for piping scintillation light to a remote conversion device, such fibres themselves may generate interfering Cherenkov radiation and may also degrade rapidly in high radiation environments.

As another example, in-core flux detectors typically have very low sensitivity, making them impractical for low power reactors or stored fuel. In-core flux detectors may also be difficult to interpret because generally they react to multiple types of radiation simultaneously and they often have complex delayed components in their response.

A further example, ion chambers and fission chambers are relatively large active devices that typically require high voltage for operation and very good quality shielded electrical cables for signal transmission. Accordingly, they typically cannot be deployed to physically challenging locations, and the cables and connectors are affected by intense radiation fields. Also, when used in a reactor core, the signal from these devices changes over time as a result of neutron induced transmutation.

As disclosed herein, a small-diameter highly-reflective conduit may be used as a light guide to monitor the Cherenkov light generated in reactors or spent fuel pools. The conduit can be localized to the position of interest with a resolution in the mm range, and the collected transmitted light can be detected remotely away from the radiation fields. Optionally, an offset or curvature of the tube may be provided to inhibit or prevent direct radiation streaming through a radiation barrier, but allow the transmission of Cherenkov light through the tube.

Advantageously, and in contrast to other localized detectors, there need not be an active detection element that can be degraded by the intense radiation environment where the radiation field strength is being measured. Also, the optical properties of the conduit may not be materially affected over time by the intensive radiation.

Cherenkov light intensity is relatively weak, and expecting that a light signal will decay when transmitted through a hollow light guide conduit, it was typically assumed that no detectable signal (or at least no useful signal) would be observed at the output end of the tube.

However, described further below, both analytical and numerical models to predict the transmission efficiency of light in highly polished small bore light guides were developed. Surprisingly, for an 8 m long, 5 mm inner diameter stainless steel tube with reflectivity of 95%, the transmission efficiency for Cherenkov radiation was determined to be more than $10^{-4}$. For a typical pool-type reactor, with an in-core flux of gamma-ray above 1 MeV energy greater than $10^{10}$ cm$^{-2}$ s$^{-1}$, the detectable signal is expected to be on the order of $10^6$ Cherenkov photons per second in the range of 200 to 600 nm.

The range of transmission and detection efficiencies covered by such a system may be suitable for applications ranging from the verification of spent fuel stored underwater to monitoring special nuclear material transmutation via the measurement of fission power distribution inside a pool-type reactor.

Figure 3:
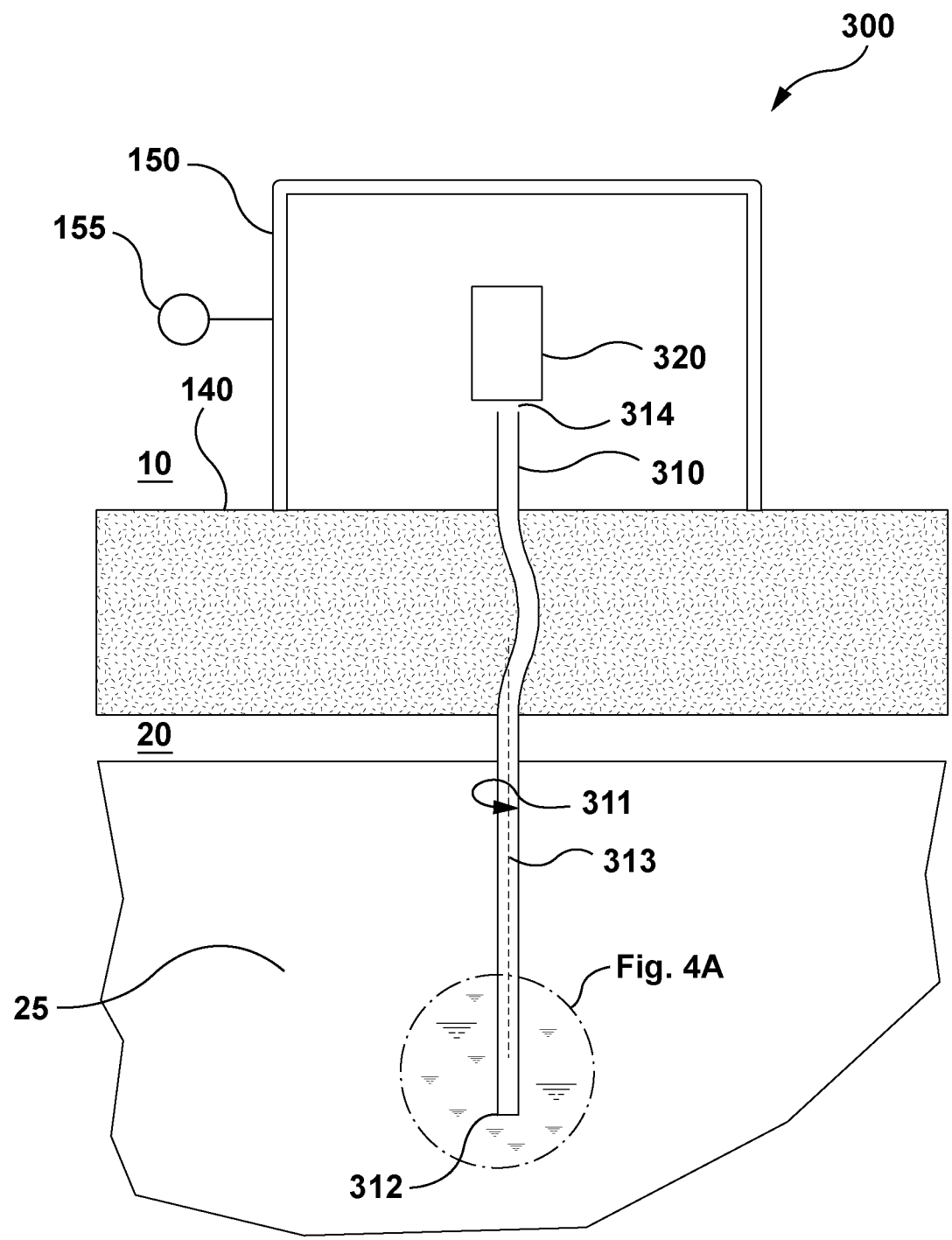
FIG. 3 is a schematic view of another example of a detection apparatus.
Figure 4A:
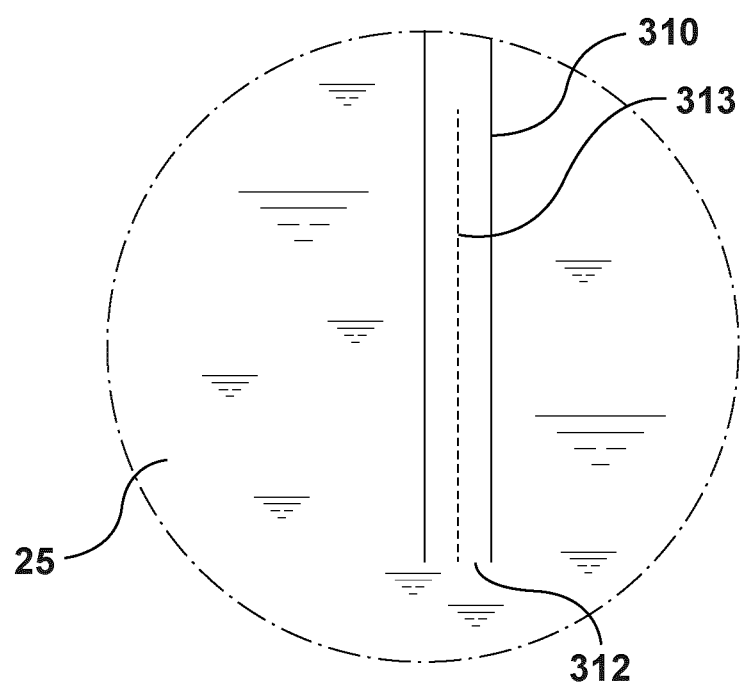
FIG. 4A is an enlarged view of the area 4 in FIG. 3 when the interior of the conduit is at a first pressure.
Figure 4B:
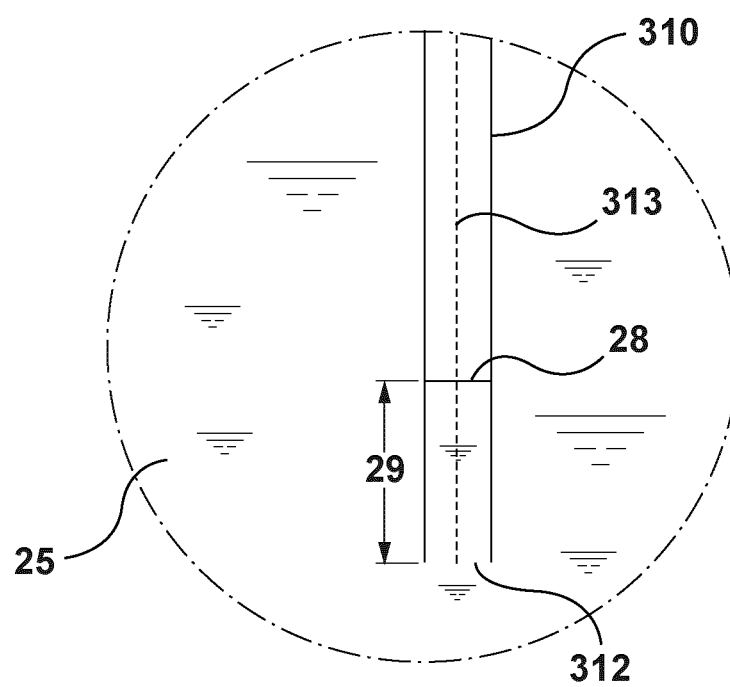
FIG. 4B is an enlarged view of the area 4 in FIG. 3 when the interior of the conduit is at a second pressure.
Figure 4C:
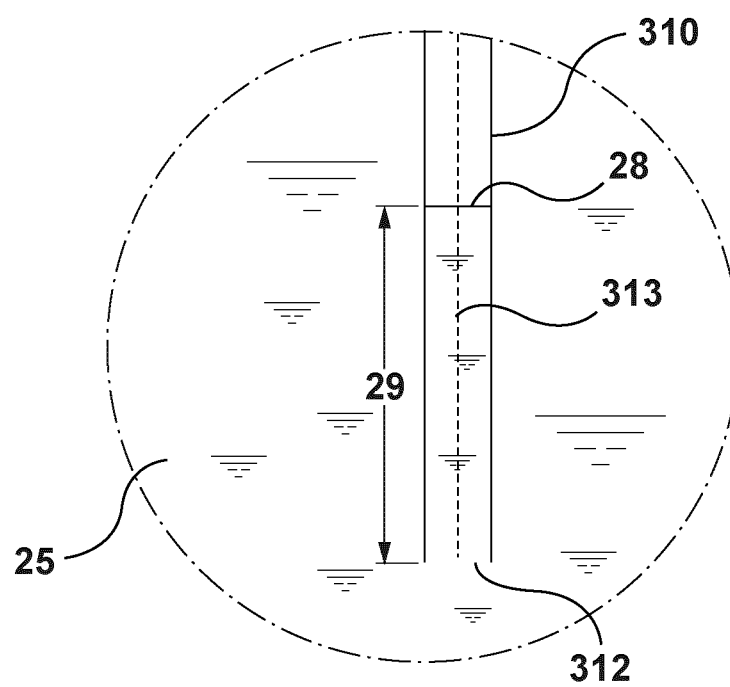
FIG. 4C is an enlarged view of the area 4 in FIG. 3 when the interior of the conduit is at a third pressure.
Figure 4D:
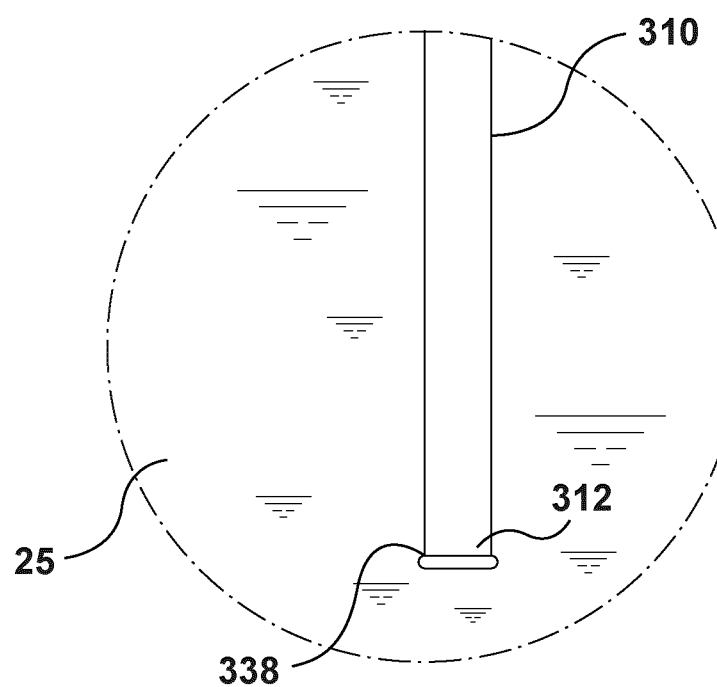
FIG. 4D is an enlarged view of the area 4 in FIG. 3 with a seal positioned at the end of the conduit.

FIGS. 3-4D illustrate an apparatus, shown generally as 300, for detecting Cherenkov light emitted from an object submerged in a liquid and located in a radioactive environment. Components similar to those in apparatus 100 and 200 have been similarly numbered, and will not be described further. In this embodiment, the area containing the radioactive material may be a fuel storage pool, the core of an active nuclear reactor or other such environments. When analyzing these environments, it can be helpful to measure the concentration of radiation at different locations within the environment. For example, it may be useful in some instances to measure the concentration of radiation at the bottom of a fuel storage pool as well as at one or more other depths between the bottom of the pool and the exposed surface of the water.

Alternatively, it may be useful to measure the concentration of radiation at multiple locations within a reactor core, for example to measure reactivity in the centre of the core, as opposed to at a location toward the periphery of the core. Taking measurements of the radiation concentration at a few discrete locations along the length of a light guide apparatus (such as those described herein) may provide information about the radiation concentration at those discrete locations, and optionally may be used to extrapolate and/or interpolate the characteristics of the hazardous environment at locations between the discrete measurement points.

As shown in FIG. 3, the first end 312 of light guide 310 is submerged within a liquid 25 (e.g. water) located in the radioactive environment 20. The second end 314 of light guide 310 is spaced from light detector 310, and light detector 320 and second end 314 of light guide 310 are located within a pressure tight enclosure 350. In this arrangement, the water level inside the light guide tube 310 can be controlled by increasing or decreasing the pressure within the enclosure 350 and tube 310. In the illustrated example, a pressure-regulated gas supply 355 is provided in fluid communication with enclosure 350. This allows gas (e.g. Helium, Carbon Dioxide, or other suitable gasses) to be introduced and/or removed from enclosure 350 and light guide 310 to control the air pressure within the conduit 310. Alternatively, or additionally, one or more vents (not shown) may be provided on enclosure 350 to facilitate the regulation of air pressure within enclosure 350 and light guide 310. It will be appreciated that other suitable arrangements may be used for optically coupling the end 314 of light guide 310 to the light detector 320 while allowing control of the pressure within the light guide 310.

By regulating the level of liquid within light guide 310, the Gamma radiation intensity along the tube can be scanned at various locations. More specifically, because the outer surface of the light guide is opaque the light that travels through light guide 310 and reaches the detector 320 will be dominated by the Cherenkov light generated in the liquid inside the light guide tube 310. Accordingly, the detected light may be used to estimate the radiation field strength and hence the radioactivity distribution in objects such as used fuel elements or the fission power distribution in a critical reactor core of objects located proximate the water level within the light guide For example, as shown in FIG. 4A, the pressure within light guide 310 may be controlled such that the interior of light guide 310 is substantially free of liquid 25. That is, the water level within the light guide 310 is located at the end 312. In such a configuration, Cherenkov light that travels through light guide 110 to detector 120 may be used to estimate the intensity of radiation from the water located immediately outside the light guide 310 which may be a signal for the radiation field in the immediate vicinity of the end 312 or measured to establish a background measurement for the readings made with water inside the light guide 310.

In the configuration shown in FIG. 4B, the pressure within light guide 310 has been reduced such that liquid 25 has entered the first end 312 of light guide 310. The surface of the water within light guide 310 is shown as 28 and the water column within the light guide 310 has a height 29. In such a configuration, Cherenkov light that travels through light guide 310 to detector 320 may be used to measure the integrated radiation field intensity in the water volume inside the light guide 310.

In the configuration shown in FIG. 4C, the pressure within light guide 310 has been further reduced such that the height 29 of the water column within light guide 310 is higher than in the configuration of FIG. 4B. In such a configuration, Cherenkov light that travels through light guide 310 to detector 320 may be used to measure the integrated radiation field intensity in the water volume inside the light guide 310.

Comparing the light output from water columns of different heights, may help provide a profile of the radiation levels at different depths within the water. Alternatively, as shown in FIG. 4D, an end cap 338 may be provided at the first end 312 of light guide 310 to prevent liquid 25 from entering light guide 310. End cap 338 may be made of any suitable material (optionally the same material as the rest of the light guide 310), and optionally may be provided with a reflective or mirrored surface in order to increase the amount of Cherenkov light that is directed towards the second end 314 of the light guide. Optionally, the end cap 338 may be openable to allow liquid to enter the first end 312 of the light guide 310, and can then be closed to cover the open end of the light guide 312. Closing the end cap 338 may help limit the entrance of additional Cherenkov light into the light guide 310, particularly if the outer surface of the end cap 338 is opaque. For example, when the end cap 338 is open, some of the Cherenkov light emitted from the water located below and outside of the light guide 310 may enter the open first end 312. This light would then be measured by the detector 320. When the end cap 338 is closed, the light travelling through the light guide 310 may be substantially limited to light that is emitted by the water column that is contained within the light guide 310 itself. As the height 29 of this water column can be monitored and varied, closing the end cap 338 may help a user detect a quantity of light that is emitted by different volumes of water, and possibly determine radiation concentration gradients based on such relationships (e.g. determining the amount of radiation present at different depths in the fuel storage pool or reactor). Optionally, the end cap 338 can be configured to primarily define the light-emitting volume of water and need not restrict the flow of water for example there may be a small aperture in the end cap 338 or at the bottom of the light guide 310 that admits water but restricts light.

Using the end seal 338/mirror may (a) help define the light-emitting volume and (b) help increase the light traveling to the open end of the light guide 310. One advantage of apparatuses described herein may be that they do not require active detection element that can be degraded by the intense radiation environment where the radiation field strength is being measured. Rather, the Cherenkov light generated by the radiation radioactivity is guided outside the intense radiation environment by the metal tube, thus simplifying the process of detection and localization. In contrast to other localized detectors, the system performance may not be affected by radiation over time. The apparatus 300 is schematically drawn housed in a sealed enclosure because it can be conceptually used to control the pressure in the system, and hence the water level inside the light guide 310.

Operating the apparatus 300 in this manner may allow a user to determine the radiation profile/gradient within a fuel storage pool, and to determine the radiation concentration at various depths within the pool. Such measurements may help a user determine the quantity and/or age of the nuclear fuel stored within the storage pool, and/or may help determine the depth of water that is required to safely contain the radiation emitted by the spent fuel.

Experimental and Analytical Results

Experimentation, calculation, and simulation was conducted to demonstrate the feasibility of detecting Cherenkov light transmitted through a small-diameter conduit with a highly-reflective inner surface. For example, such a method may be used to monitor the Cherenkov light generated in nuclear reactors and/or spent fuel pools.

Experimental Set-Up

Referring to FIGS. 5A-12, experiments were conducted to measure Cherenkov light, generated by a radioactive source, transmitted through a polished stainless steel tube, and detected by a PhotoMultiplier Tube (PMT). The test apparatus 400 is generally analogous to the apparatus 100 described herein, and like features are identified using analogous reference characters indexed by 300.

Figure 5A:
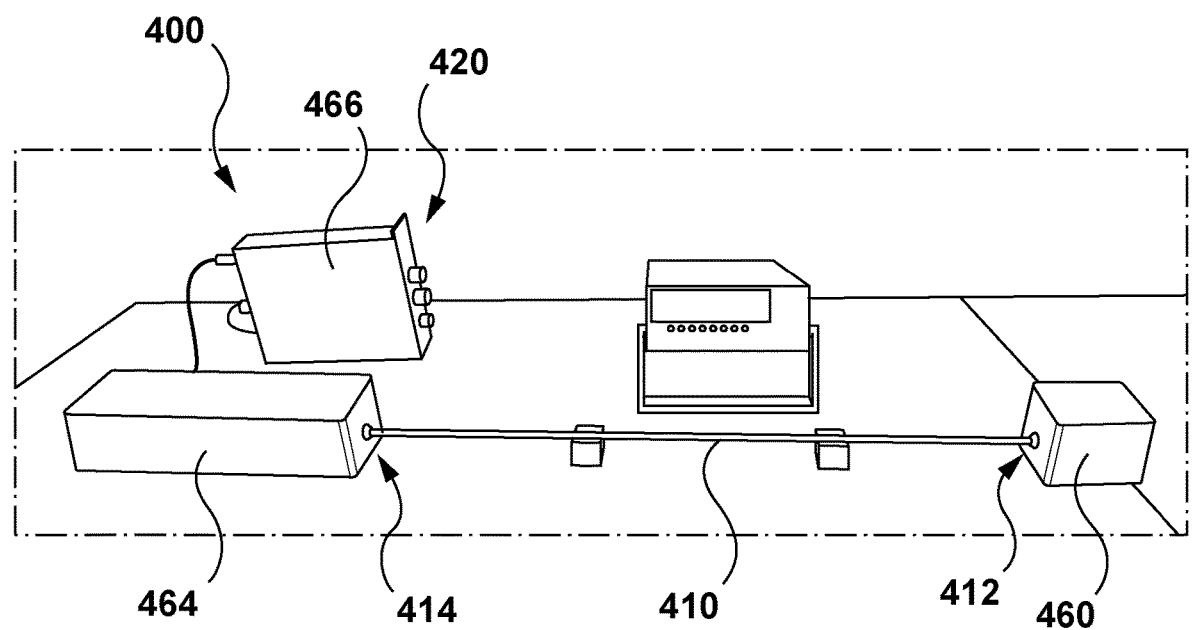
FIGS. 5A-5C are photographs of an experimental set-up used to demonstrate the feasibility of detecting Cherenkov light transmitted through a small-diameter highly-reflective metallic tube.
Figure 5B:
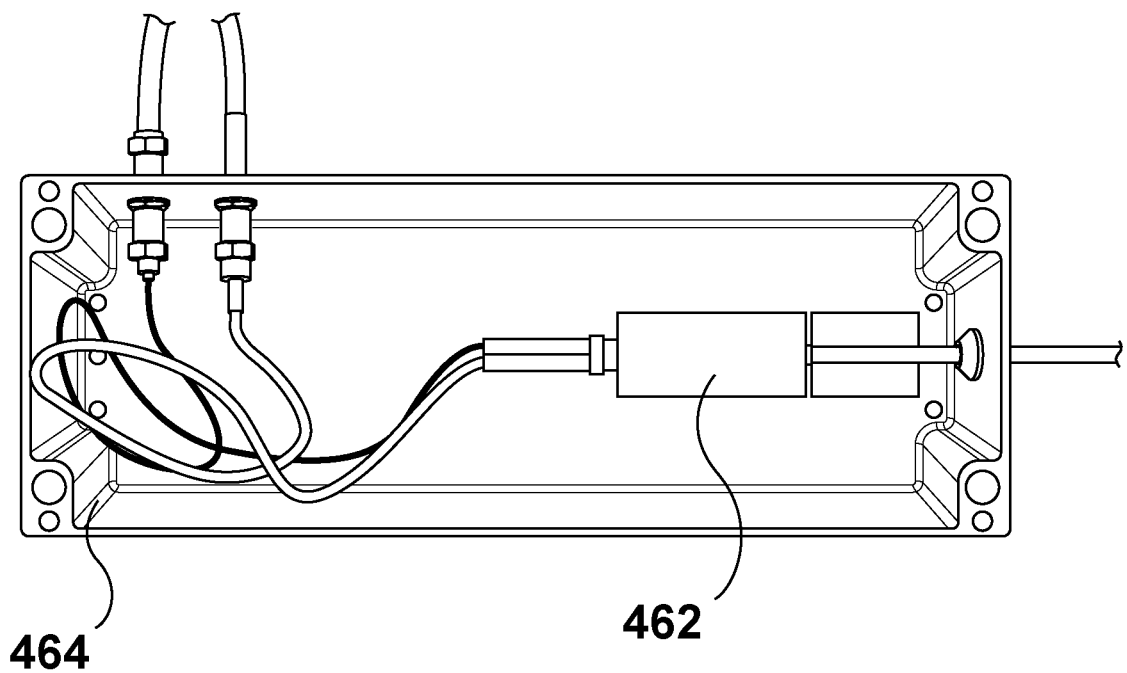
Figure 5C:
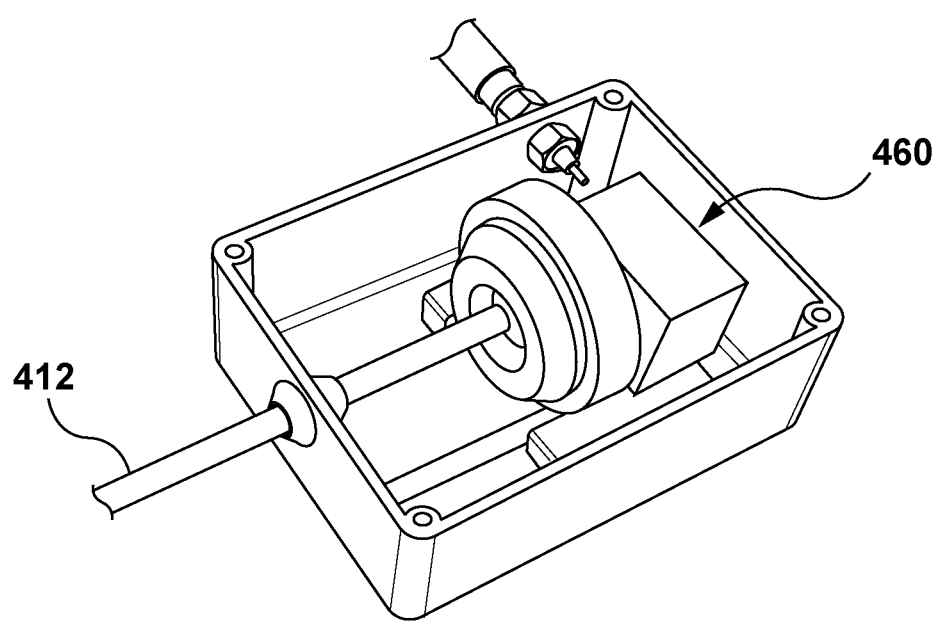

As shown in FIG. 5A, a radiation source and a first end 412 of a hollow metal tube 410 was placed in a first sealed metal box 460 (see FIG. 5C), and a PMT 462 and a second end 414 of the hollow metal tube 410 was placed in a second sealed metal box 464 (see FIG. 5B). The ends of the tube 410, the source, and the PMT 462 were enclosed in sealed metal boxes in order to minimize the background from ambient light. There was essentially no detectable ambient light and the only background was the dark current of the PMT, which was below 0.3 nA. In this arrangement, the PMT 462 forms part of the detector 420.

A Carbon-14 source sealed in a quartz radiator was used to generate Cherenkov light. Two sources with different radiator materials were used in the experiment to provide a mixture of Cherenkov and scintillation light with different spectra one source peaked at 300 nm and the other source peaked at 380 nm. The registered sources have measured radioactivity on the order of $10^8$ Bq.

The radiation source was placed in front of a first end 412 of an ultra-high polished type 316 stainless steel tubing 410 with an inner diameter of 4.57 mm. The tube was ordered from the McMaster-Carr® Supply Company of Elmhurst Ill., U.S.A. The item number was 3334K21, with the inner surface polished to a 10 μin Ra finish. Ra is the roughness parameter representing the arithmetic average of the surface peaks and valleys E. P. DeGarmo, J. T. Black, and R. A. Kohser, *Materials and Processes in Manufacturing*, 9th Edition, page 223 (Wiley, 2003). The light guides described herein can be designed to have any suitable surface roughness, that provides a suitable transmission of light for a given application. The roughness can be, for example about 25 μin Ra or less, about 20 μin Ra or less, about 15 μin Ra or less and about 10 μin Ra or less.

The other end 414 of the tube was placed in front of a PMT 462 to detect the transmitted light. The PMT was a R760 PMT as available from Hamamatsu Photonics K. K. of Hamamatsu city Japan, with a round Photocathode area of 10 mm diameter. The spectral response ranges from 160 to 650 nm, and peaked at 420 nm. The signal from the PMT 462 was read by a model 6517B electrometer 466 as available from Keithley Instruments of Solon, Ohio, U.S.A. which also forms part of the detector 420. For each measurement, the current reading was averaged over 100 samplings.

Transmission Measurement Results

The transmission of Cherenkov light was measured with tubes 410 of various lengths from 0.15 to 1.83 m. Transmission is defined as the ratio of output light to the amount entered into the tube. The results are summarized in Table 1. The background (i.e. PMT dark current) was very low (<0.3 nA) and therefore was neglected. The measurements from the two sources were very consistent, usually within about 5% for the normalized results, as shown in the last two columns in Table 1. The dominant uncertainty was not the statistics limit of the signals; rather it was due to the uncertainty in positioning the source, tube and detector. This was established by repeating the measurements after disassembly and reassembly of the whole setup, where it was found that the results can be reproduced within a 10% band. Therefore, a 10% relative uncertainty is quoted for each measurement.

TABLE 1

Results of the Cherenkov light transmission measurements

| Length (m) | Current (nA) | | Light transmission normalized to 0.15 m | |
|---|---|---|---|---|
| | 380 nm | 300 nm | 380 nm | 300 nm |
| 0.152 | 590 | 90 | 1 | 1 |
| 0.305 | 248 | 39 | 0.42 | 0.43 |
| 0.610 | 122 | 19.5 | 0.21 | 0.22 |
| 0.914 | 81.5 | 12.5 | 0.14 | 0.14 |
| 1.219 | 51.48 | 7.8 | 0.09 | 0.09 |
| 1.829 | 35.8 | 6.5 | 0.06 | 0.07 |

Calculations

Figure 6:
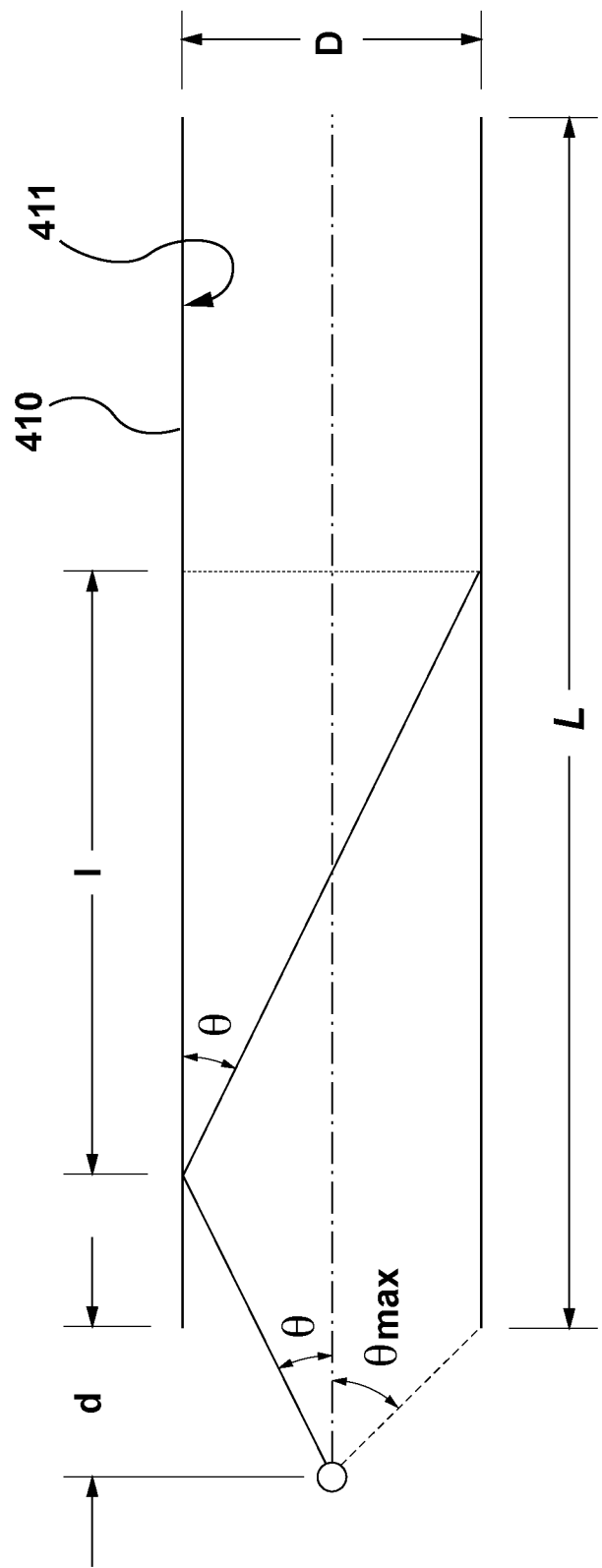
FIG. 6 is a schematic diagram of geometric parameters used in analytical calculations for transmission of Cherenkov light through a small-diameter highly-reflective hollow tube.

With some approximations and assumptions, the transmission can be calculated analytically. The surface finish of the interior surface of the tube 410 is close to the mirror quality used in the industry standard, therefore the reflection is assumed to be pure specular in the following analytical calculation. Assuming a point isotropic light source located along the axis of the tube, the number of photons (N) which are transmitted through the tube can be calculated as:

$$N = \frac{N_0}{4\pi} \int_0^{2\pi} d\varphi \int_0^{\theta_{max}} R^{\frac{L \tan \theta}{D}} \sin \theta \, d\theta \quad (2)$$

where $N_0$ is the total number of photons emitted, R is the reflectivity, and all other notations are illustrated in FIG. 6. Equation (2) is the integral of all photons entered into the tube, with each photon weighted by the probability to be transmitted through.

$$\frac{L \cdot \tan \theta}{D}$$

is the number of reflections required for a photon emitted at angle $\theta$ to be transmitted through the tube. The maximum angle allowed for a photon to enter the tube is:

$$\theta_{max} = \tan^{-1} \frac{D}{2d} \quad (3)$$

Monte-Carlo Simulation

Figure 7:
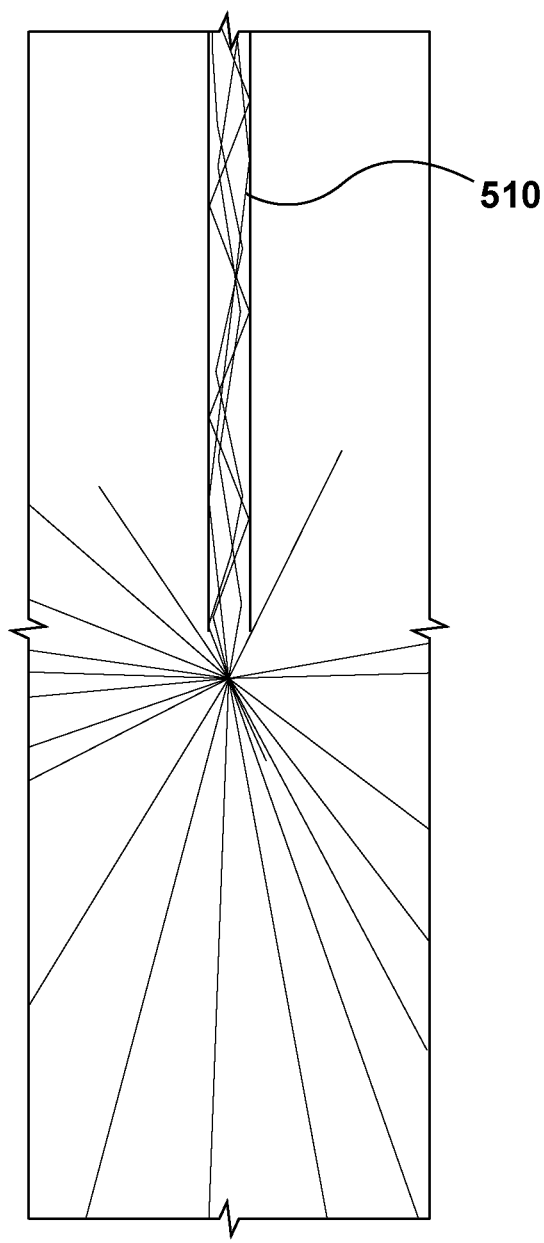
FIG. 7 is a snapshot of a GEANT-4 simulation showing photon trajectories and a hollow tube.

Equation (2) may be used to calculate the pure specular reflection. To include the diffuse reflection and mimic the non-perfect finish of the optical surface, a Monte Carlo simulation was built using the UNIFIED Model (A. Levin and C. Moisan, in, 1996 *IEEE Nuclear Science Symposium, 1996. Conference Record* (1996), pp. 702-706 vol. 2. of GEANT4 (Agostinelli S. et al., Nucl. Instrum. Methods Phys. Res., Sect. A 506, 250 (2003). I. M. Frank and I. Tamm, C. R. Acad. Sci. URSS 14, 109 (1937). A snapshot of the simulation is shown in FIG. 7, in which the lines are the trajectory of photons, and the cylinder (illustrated as an example of a light guide 510) is modeled as a metallic tube.

The non-perfect finish of the surface was approximated by many micro-facets with normal vectors that follow a Gaussian distribution with standard deviation $\sigma_\alpha$ around the average normal of the surface. Other parameters specified in the simulation are the specular spike constant $C_{ss}$ which controls the specular reflections about the average normal of the surface, the specular lobe constant $C_{sl}$ which controls the probability of specular reflections about the normal of a micro-facet, and the diffuse lobe constant $C_{dl}$ which represents the Lambertian reflection. It is expected that for a fixed total reflectivity R, increasing other parameters will reduce the transmission. However, increasing the total reflectivity R can compensate the effects of diffuse reflection. After fitting to the measured transmission, many combinations of these parameters R, $\sigma_\alpha$, $C_{ss}$, $C_{sl}$ and $C_{dl}$ actually give very similar results and they are all close to the calculation using Equation (2). For the ideal case of pure specular reflection, the simulation gives exact same results as the calculation. An example of the simulation, along with calculated and measured data, is shown in FIG. 8.

Figure 8:
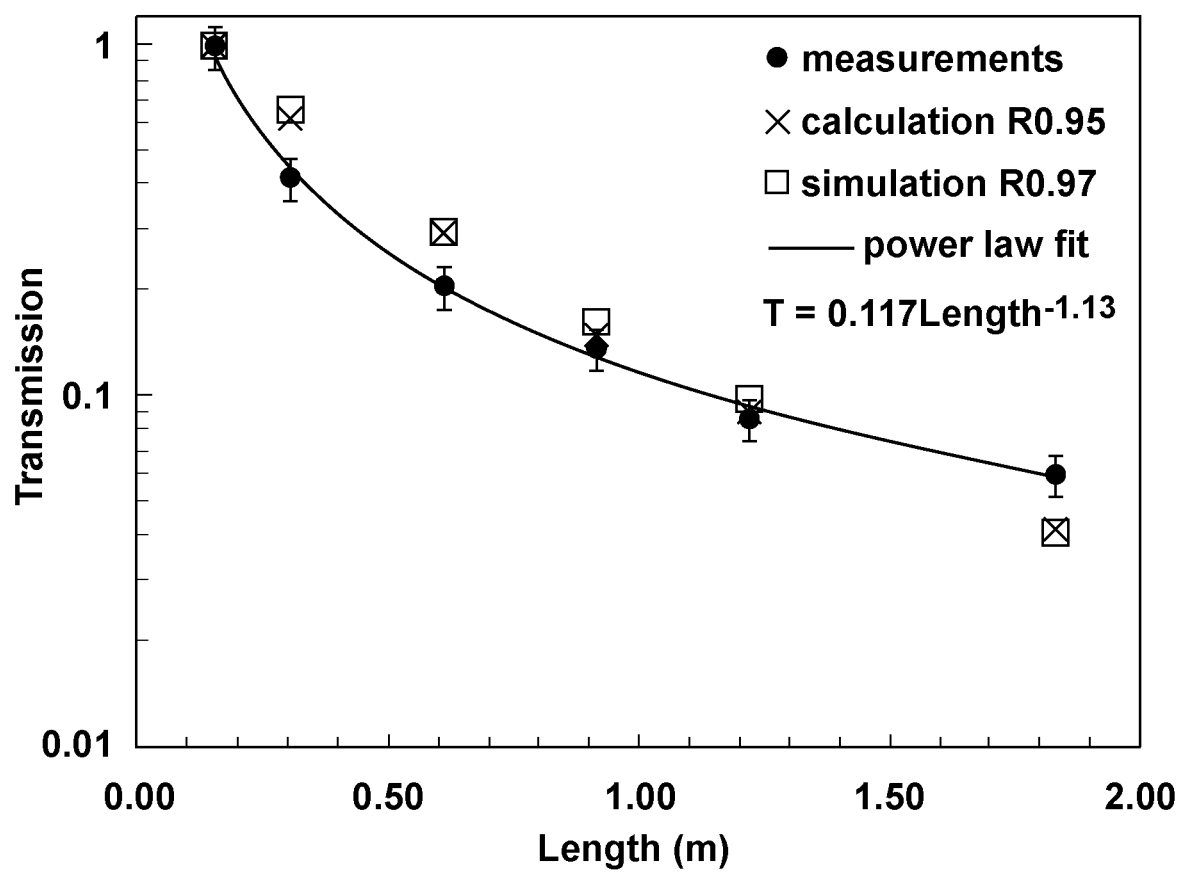
FIG. 8 is a data plot comparing measured (through a stainless steel tube), calculated (assuming total reflectivity of 0.95), and simulated (assuming total reflectivity of 0.97) transmission of Cherenkov light, normalized to the transmission through a tube 0.15 m in length.

In FIG. 8, all data are normalized to the transmission through a tube with a length of about 0.15 m. The results are compared with calculated results (assuming total reflectivity of 0.95), and simulation results (using total reflectivity of 0.97), $\sigma_\alpha$=10, C=0.9, $C_{sl}$=0.1 and $C_{dl}$=0.

Table 2 shows transmission values at various reflectivity (R), inner diameter (I.D.) and distance values that were calculated using Equation (2). These transmission values assume a point isotropic source located at the entrance of the tube.

TABLE 2

Transmission at various reflectivity (R), inner diameter (I.D.) and distance

| | | Transmission after (m) | | | |
|---|---|---|---|---|---|
| I.D. (mm) | R | 4 | 6 | 8 | 10 |
| 1 | 0.85 | 2.3E−6 | 1.0E−6 | 6.0E−7 | 3.8E−7 |
| 1 | 0.87 | 3.0E−6 | 1.4E−6 | 8.2E−7 | 5.2E−7 |
| 1 | 0.89 | 4.4E−6 | 2.1E−6 | 1.2E−6 | 7.4E−7 |
| 1 | 0.91 | 6.7E−6 | 3.2E−6 | 1.8E−6 | 1.1E−6 |
| 1 | 0.93 | 1.2E−5 | 5.4E−6 | 3.0E−6 | 1.9E−6 |
| 1 | 0.95 | 2.3E−5 | 1.1E−5 | 6.0E−6 | 3.8E−6 |
| 1 | 0.97 | 6.6E−5 | 2.8E−5 | 1.7E−5 | 1.1E−5 |
| 1 | 0.99 | 5.9E−4 | 2.7E−4 | 1.5E−4 | 9.2E−5 |
| 3 | 0.85 | 2.2E−5 | 9.2E−6 | 5.6E−6 | 3.4E−6 |
| 3 | 0.87 | 2.8E−5 | 1.3E−5 | 7.5E−6 | 4.6E−6 |
| 3 | 0.89 | 4.0E−5 | 1.8E−5 | 1.1E−5 | 6.6E−6 |
| 3 | 0.91 | 6.2E−5 | 2.7E−5 | 1.6E−5 | 1.0E−5 |
| 3 | 0.93 | 1.0E−4 | 4.6E−5 | 2.5E−5 | 1.7E−5 |
| 3 | 0.95 | 2.1E−4 | 9.4E−5 | 5.2E−5 | 3.3E−5 |
| 3 | 0.97 | 5.7E−4 | 2.6E−4 | 1.4E−4 | 9.0E−5 |
| 3 | 0.99 | 5.2E−3 | 2.3E−3 | 1.3E−3 | 8.6E−4 |
| 5 | 0.85 | 5.6E−5 | 2.5E−5 | 1.4E−5 | 9.2E−6 |
| 5 | 0.87 | 7.8E−5 | 3.4E−5 | 2.0E−5 | 1.3E−5 |
| 5 | 0.89 | 1.1E−4 | 5.0E−5 | 2.8E−5 | 1.8E−5 |

TABLE 2-continued

Transmission at various reflectivity (R), inner diameter (I.D.) and distance

| | | Transmission after (m) | | | |
|---|---|---|---|---|---|
| I.D. (mm) | R | 4 | 6 | 8 | 10 |
| 5 | 0.91 | 1.7E−4 | 7.8E−5 | 4.3E−5 | 2.7E−5 |
| 5 | 0.93 | 2.9E−4 | 1.2E−4 | 7.4E−5 | 4.6E−5 |
| 5 | 0.95 | 5.5E−4 | 2.6E−4 | 1.4E−4 | 9.4E−5 |
| 5 | 0.97 | 1.6E−3 | 7.1E−4 | 3.9E−4 | 2.6E−4 |
| 5 | 0.99 | 1.3E−2 | 6.1E−3 | 3.6E−3 | 2.3E−3 |
| 7 | 0.85 | 1.1E−4 | 5.2E−5 | 2.7E−5 | 1.8E−5 |
| 7 | 0.87 | 1.5E−5 | 7.1E−5 | 3.8E−5 | 2.3E−5 |
| 7 | 0.89 | 2.2E−4 | 1.0E−4 | 5.4E−5 | 3.4E−5 |
| 7 | 0.91 | 3.4E−4 | 1.4E−4 | 8.4E−5 | 5.4E−5 |
| 7 | 0.93 | 5.4E−4 | 2.5E−4 | 1.3E−4 | 8.7E−5 |
| 7 | 0.95 | 1.1E−3 | 4.9E−4 | 2.8E−4 | 1.8E−4 |
| 7 | 0.97 | 3.1E−3 | 1.4E−3 | 7.9E−4 | 5.0E−4 |
| 7 | 0.99 | 2.5E−2 | 1.2E−2 | 6.7E−3 | 4.6E−3 |
| 9 | 0.85 | 1.8E−4 | 8.3E−5 | 4.6E−5 | 3.0E−5 |
| 9 | 0.87 | 2.5E−4 | 1.1E−4 | 6.3E−5 | 4.1E−5 |
| 9 | 0.89 | 3.6E−4 | 1.6E−4 | 8.9E−5 | 6.0E−5 |
| 9 | 0.91 | 5.5E−4 | 2.5E−4 | 1.4E−4 | 9.2E−5 |
| 9 | 0.93 | 9.5E−4 | 4.0E−4 | 2.4E−4 | 1.5E−4 |
| 9 | 0.95 | 1.8E−3 | 8.3E−4 | 4.5E−4 | 3.0E−4 |
| 9 | 0.97 | 5.1E−3 | 2.3E−3 | 1.3E−3 | 8.4E−4 |
| 9 | 0.99 | 3.8E−2 | 1.9E−2 | 1.1E−2 | 7.1E−3 |
| 10 | 0.85 | 2.2E−4 | 9.9E−5 | 5.6E−5 | 3.5E−5 |
| 10 | 0.87 | 3.1E−4 | 1.4E−4 | 7.8E−5 | 4.9E−5 |
| 10 | 0.89 | 4.0E−4 | 2.0E−4 | 1.1E−4 | 7.1E−5 |
| 10 | 0.91 | 6.9E−4 | 3.1E−4 | 1.7E−4 | 1.1E−4 |
| 10 | 0.93 | 1.2E−3 | 5.0E−4 | 2.9E−4 | 1.8E−4 |
| 10 | 0.95 | 2.2E−3 | 1.0E−3 | 5.5E−4 | 3.8E−4 |
| 10 | 0.97 | 6.0E−3 | 2.8E−3 | 1.6E−3 | 1.0E−3 |
| 10 | 0.99 | 4.5E−2 | 2.3E−2 | 1.3E−2 | 8.7E−3 |

Both the calculation and the simulation assume an isotropic point source while in reality the Cherenkov radiator was a volume source with some angular distribution of light emission. These factors may account for the discrepancy between the data and modelling. The data can be fit well by an empirical power law of:

$$\text{Transmission} = T_0 \times 0.117 \times \text{Length}^{-1.127} \quad (4)$$

where $T_0$ is the transmission at the first measurement point of 0.152 m. However, Equation (2) gives a more conservative estimation (i.e., lower transmission than actually observed) and it is used in the calculation in the following sections.

Bending Test Results

While monitoring the reactor core, a slight curvature or displacement of the tube may be desirable to prevent direct radiation streaming, but it is believed that this curvature does not materially affect the transmission of the Cherenkov light thorough the light guide 410.

To observe the effect of curvatures on the transmission of light through the hollow conduit 410, experiments were conducted in which a curvature was produced by forcing the tube to attach to a few points which were not on a straight line. The resultant curvature can be approximated by a cubic spline. Bending experiments were performed using a 1.22 m long tube, and two curvatures were created.

The first slight curvature was created by fixing the two ends 412, 414 of the tube and moving the center of the tube by 1.2 cm. In many practical applications, this amount of bending is expected to be sufficient to avoid direct radiation streaming. Within uncertainties no reduction of transmission was observed in this case.

Figure 9:
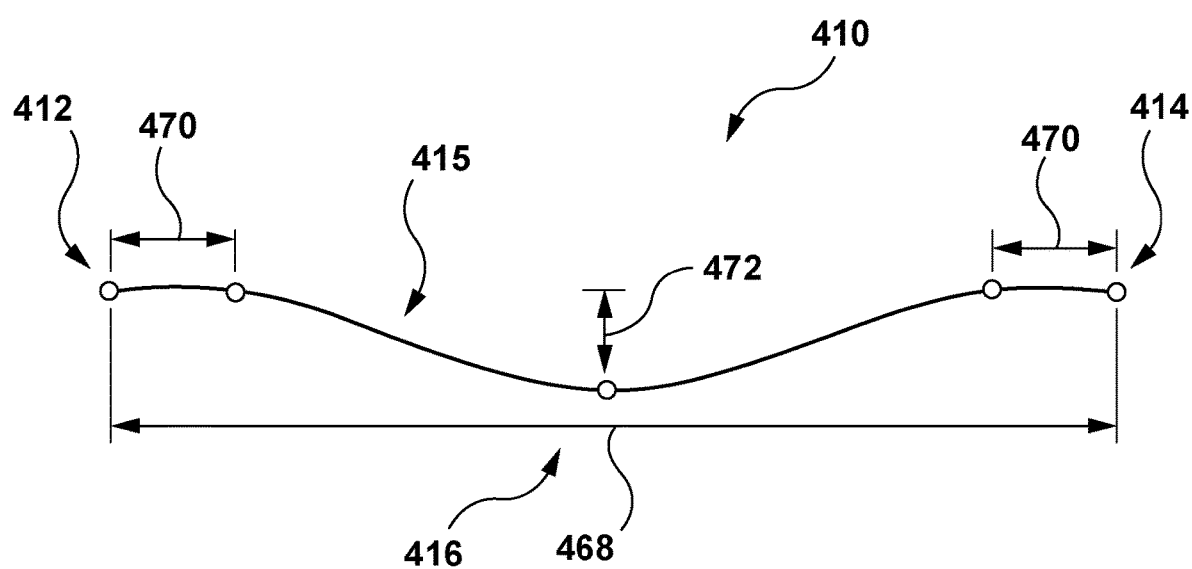
FIG. 9 is a schematic diagram of tube curvature used in an experiment to measure transmission of Cherenkov light through a bent tube.

A second, larger curvature was created by attaching the tube to five fixed points as illustrated in FIG. 9. In FIG. 9, the solid line represents the hollow light guide, and the dots in represent the fixed points by which the spline was created. FIG. 9 is not to scale; the length of the conduit 469 was 122 cm, the distance 470 between the ends 412, 414 of the conduit 410 and the first inflection was 9 cm, and the offset from the ends in the middle of the conduit 472 was 3 cm (see also offset distance 172 in FIG. 1 as an example of the offset in a different embodiment). The transmission was reduced by a factor of 2 in this case.

Based on the results of these bending experiments, it is expected that a hollow light guide may be bent by a sufficient amount to avoid direct radiation streaming (i.e. to prevent a straight line-of-sight from one end of the tube to the other end) while still maintaining sufficient light transmission through the light guide so as to provide useful measurements in most practical embodiments.

Estimation of Cherenkov Light Intensity in a Pool Type Fission Reactor Core

Under some assumptions and approximations, the order of magnitude of the signal intensity using this method to monitor a typical pool type reactor core or spent fuel pool can be estimated (for example as schematically illustrated in FIGS. 3-4c). The number of Cherenkov photons dN emitted at wavelength λ by a charged particle moving a distance dx at speed βc can be described by the Frank-Tamm formula (Frank and Tamm, 1937):

$$\frac{dN}{d\lambda dx} = \frac{2\pi \alpha z^2}{\lambda^2} \sin^2 \theta_c \quad (5)$$

where α=1/137 is the fine-structure constant, z is the charge number of the particle, and $\theta_c$ is the Cherenkov angle.

The Cherenkov angle $\theta_c$ is dependent on the electron energy:

$$\sin^2 \theta_c = 1 - \frac{1}{n_{(\lambda)}^2 \beta^2} \quad (6)$$

The index of refraction n is dependent on the wavelength λ, and the values for water can be found in, e.g. (G. M. Hale and M. R. Querry, Appl. Opt. 12, 555 (1973). At 400 nm, which is a typical value for the high wavelength end of Cherenkov light, the index of refraction n is 1.34 (which be used as the typical value in the following calculation, since n does not change dramatically), and the threshold energy for electrons to produce Cherenkov light is 0.26 MeV.

The range of sensitivity of the PMT used in this experiment is between 160 nm and 650 nm peaked at 420 nm, as specified by the manufacturer (Hamamatsu Photonics). However, we do not assume this whole range is practically sensitive. A typical PMT has a sensitivity range of 200 nm (W. R. Leo, *Techniques for Nuclear and Particle Physics Experiments: A How-to Approach*, 2nd ed. (Springer, 1994). therefore 200 nm width peaked at 420 nm is used in the following calculation. Integrating Equation (5) over λ gives:

$$\frac{dN}{dx} = 2\pi z^2 \alpha \sin^2 \theta_c \int_{\lambda_2}^{\lambda_1} \frac{d\lambda}{\lambda^2} = 550 \sin^2 \theta_c \text{ photons/cm} \quad (7)$$

Considering a typical average quantum efficiency of 20% for a PMT, an efficiency factor $f_{PMT}$ is introduced to count this effect in the following calculation:

$$f_{PMT} = 0.2 \quad (8)$$

Figure 10:
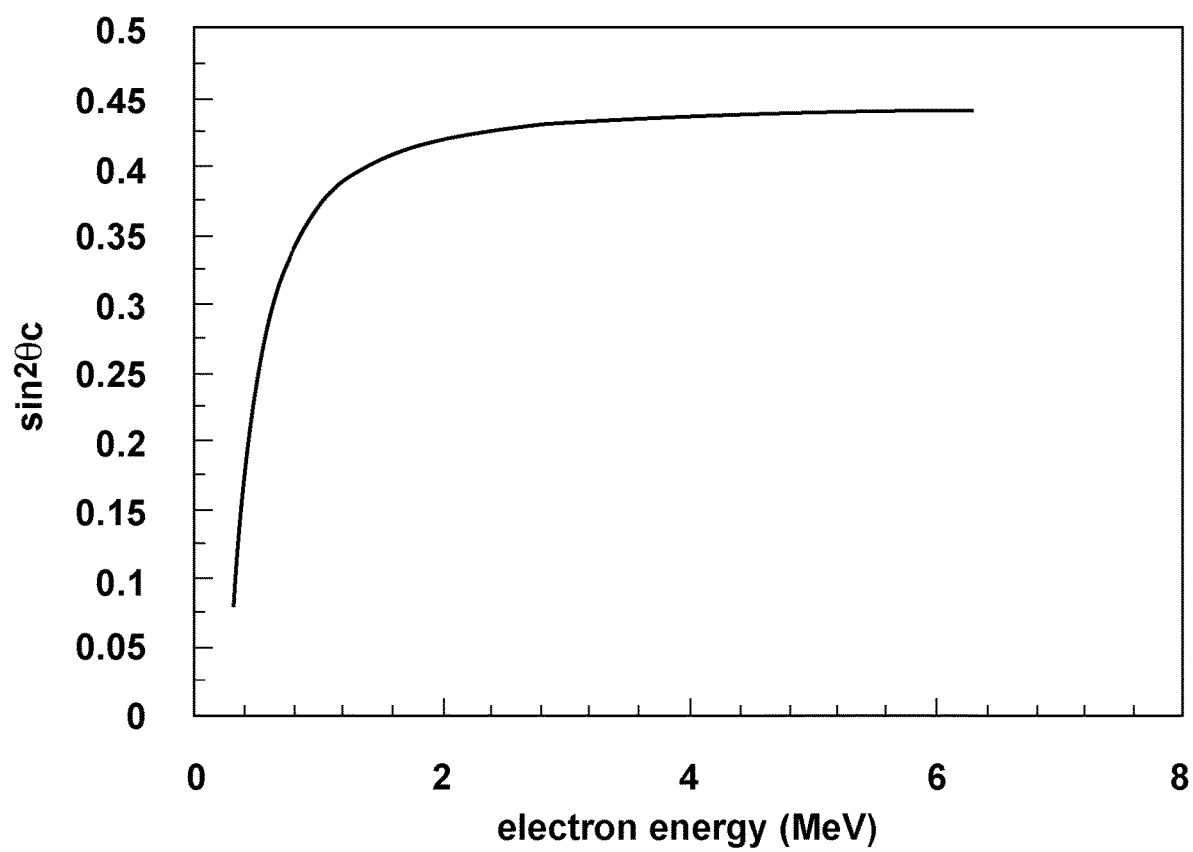
FIG. 10 is a data plot showing energy dependence of $\sin^2 \theta_c$, for an index of refraction of 1.34.

The majority of Compton electrons have sufficient energy to produce Cherenkov light (B. Brichard, A. F. Fernandez, H. Ooms, and F. Berghmans, Measurement Science and Technology 18, 3257 (2007). To estimate the average Cherenkov angle, the electron energy spectrum is required. Note that Equation (6) decreases quickly when electron energy is below 1 MeV, and $\sin^2 \theta_c$ only changes slightly beyond 1 MeV, as shown in FIG. 10. Therefore $\sin^2 \theta_c$ is estimated to be 0.4 for electron energies higher than 1 MeV. The following paragraph will discuss that most Compton electrons used in the estimation do have energy larger than 1 MeV.

Figure 11:
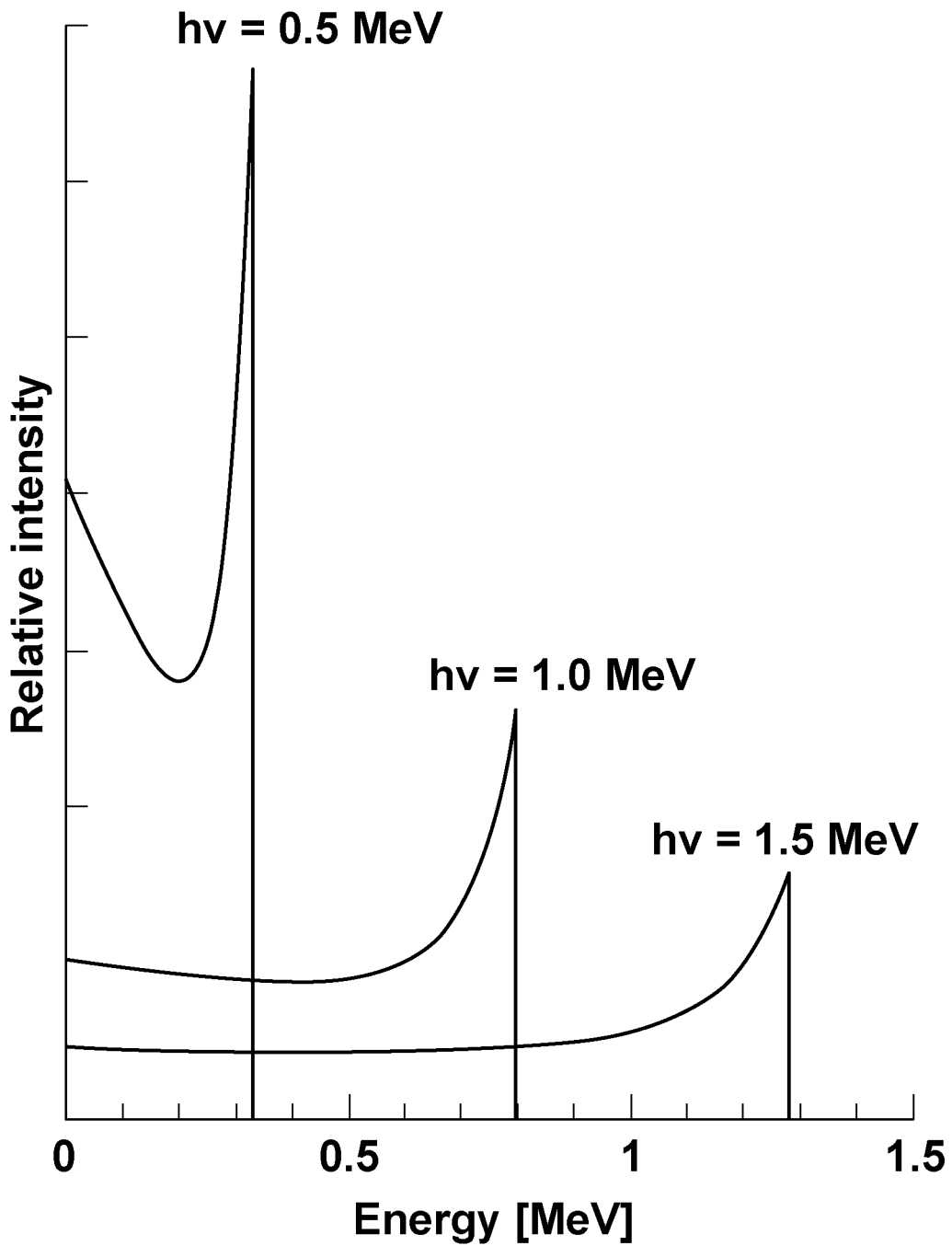
FIG. 11 is a data plot showing energy spectra of Compton recoil electrons calculated using Equation (10)
Figure 12:
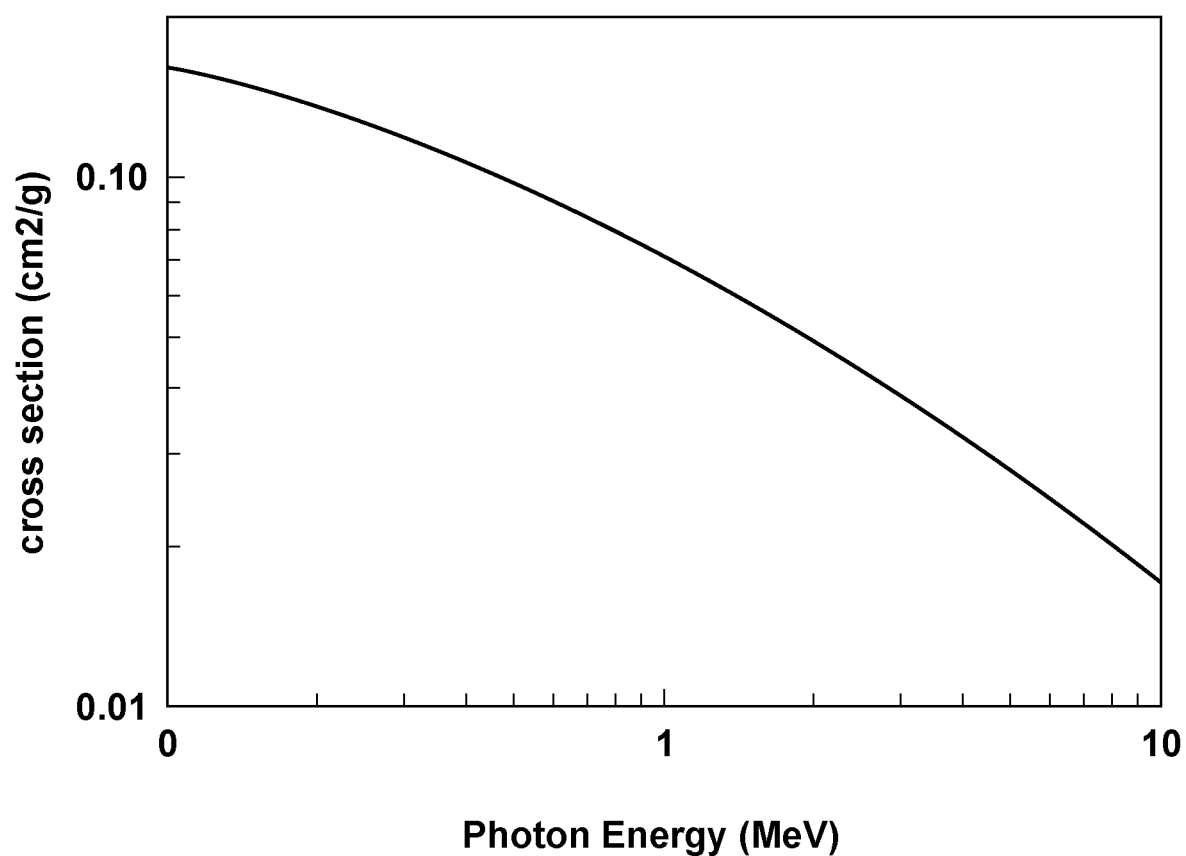
FIG. 12 is a data plot showing total incoherent scattering cross section of gamma in water, from 0.1 to 10 MeV.

In the Compton scattering process, the electron energy $E_\beta$ can be calculated as:

$$E_\beta = hv \frac{\gamma(1 - \cos \theta)}{1 + \gamma(1 - \cos \theta)} \quad (9)$$

where hv is the photon energy, $\theta$ is the scattering angle of a photon, and $\gamma = hv/m_e c^2$. The energy distribution of the Compton recoil electrons can be calculated by the Klein-Nishina formula (O. Klein and Y. Nishina, Zeitschrift Für Physik 52, 853 (2013).

$$\frac{d\sigma}{dE_\beta} = \frac{\pi r_e^2}{m_e c^2 \gamma^2} \left[ 2 + \frac{s^2}{\gamma^2(1-s)^2} + \frac{s}{1-s}\left(s - \frac{2}{\gamma}\right) \right] \quad (10)$$

where $r_e$ is the classical electron radius and $s=E_\beta/hv$. A few examples of the Compton electron energy spectrum calculated using Equation (10) are shown in FIG. 11. The tabulated experimental data for electron energy spectrum in Compton scattering is also available in (H. E. Johns, J. E. Till, and D. V. Cormack, (1954). For gamma ray energies greater than 1 MeV, the calculation and the measurement in H. E. Johns, J. E. Till, and D. V. Cormack, (1954) indicate that Compton electron energy spectrum is generally flat from zero to the maximum electron energy, with a peak around the highest energy position. This means that more than half number of Compton electrons have energy larger than the half energy of the photon. To estimate the average electron energy, the gamma ray energy spectrum is then needed.

Gamma ray spectrum is estimated using an example provided in
(James W. Sterbentz, in *Reactor Dosimetry State of the Art 2008* (WORLD SCIENTIFIC, 2009), pp. 596-606., which calculated gamma ray spectra across a reactor core. This calculation shows that most gamma ray energies are in the range of 0.1 to 5 MeV, while there is still a large portion of gamma with energy larger than 1 MeV. Based on FIG. 10, only gamma energies larger than 1 MeV were considered. Therefore the range of interest for gamma energies is from 1 to 5 MeV, which contributes about 25% of all gamma flux. Within this energy range of gamma rays, most Compton electron energy are estimated to be within 1 to 4 MeV, which gives $$\sin^2 \theta_c \approx 0.4 \quad (11)$$

Using Equations (7) and (11), the number of Cherenkov photons generated by one electron can be estimated.
We then need to know how many electrons are generated by gamma rays. Because Compton scattering is incoherent (J. Kirz, *X-Ray Data Booklet*, 2nd ed. (Lawrence Berkeley Laboratory, University of California, 2001). the number of electrons are estimated by the total incoherent scattering cross section:

$$N_\beta = \sigma \rho \phi \quad (12)$$

in which $N_\beta$ is the number of Compton produced electrons per volume of water, $\sigma$ is the total incoherent scattering cross section of gamma in water, $\rho=1.0$ g/cm$^3$ is the water density, and is the gamma flux. The scattering cross section is obtained from the U.S. Department of Commerce Photon Cross Sections Database (available at http://www.nist.gov/pml/data/xcom/index.cfm (2015)), the retrieved values are plotted in FIG. 12. $\sigma$ is energy dependent, but it is still on the same order from gamma energies from 1 to 5 MeV. According to FIG. 12, the averaged cross section used in the calculation is:

$$\bar{\sigma} = 0.05 \text{ cm}^2/\text{g} \quad (13)$$

For the convenience of calculation, using a base value of gamma ray flux:

$$\phi_0 = 10^{10} \text{ cm}^{-2} \text{ s}^{-1} \quad (14)$$

therefore the total Compton electrons generated per second per volume of water is $$N_\beta = 5 \times 10^8 \text{ s}^{-1} \text{ cm}^{-3} \quad (15)$$

Considering the Cherenkov radiator of 1 cm length located at the end of the tube, the volume of the Cherenkov radiator is $$V = \pi (D/2)^2 = 0.16 \text{ cm}^3 \quad (16)$$

in which D=0.46 cm is the inner diameter of the tube. Combining Equations (7) and (12), the number of Cherenkov photons generated in a radiator of above mentioned size would be $$N = \left(\frac{dN}{dx} \cdot D\right) \cdot (N_\beta V) = 8.1 \times 10^9 s^{-1} \quad (17)$$

Equation (17) assumes each electron travels in a distance D averagely in the radiator. Cherenkov photons are generated isotropically, and only half of them are entering into the tube, therefore introducing a directional factor $f_{dir}$ to count this effect:

$$f_{dir} = 0.5 \quad (18)$$

The typical tube length required when monitoring a reactor core is $$L = 8 \text{ m} \quad (19)$$

Using Equation (2) and total reflectivity R=0.95, the transmission of Cherenkov light through the 8 m tube is $$T \approx 1.2 \times 10^{-4} \quad (20)$$

Therefore using Equations (17) and (20), the estimated detectable signal S (per second) in the PMT is:

$$S = N \cdot T \cdot f_{PMT} f_{dir} \approx 9.7 \times 10^4 \text{ s}^{-1} \text{ at gamma flux}$$

$$\phi_0 = 10^{10} \text{ cm}^{-2} \text{ s}^{-1} \quad (21)$$

Using the BR2 reactor [21] as an example, the gamma flux ($E_\gamma > 1$ MeV) in the core is estimated to be $2.5 \times 10^{14}$ photon cm$^{-2} \cdot$s$^{-1}$, at full reactor power (56 MW) (B. Brichard, A. F. Fernandez, H. Ooms, and F. Berghmans, Measurement Science and Technology 18, 3257 (2007)., and the core volume is about 1 m$^3$ (Belgian Nuclear Research Centre, BR2 Bruchure—available at https://www.sckcen.be/en/Research/Infrastructure/BR2 (2015)). Assuming the linear relationship between the reactor power and the gamma flux, the gamma flux would be $\phi_\gamma=4.5\times10^{12}$ photon·cm$^{-2}$·s$^{-1}$, at power density of p=1 W·cm$^{-3}$, in the BR2 reactor. Combining with Equation (21), the relation between the power density in a pool type fission reactor core, and the detectable Cherenkov signal (S) generated by 1 cm Cherenkov radiator and transmitted through an 8 m long, 4.57 mm I.D. light guide with reflectivity of 0.95 is:

$$S \approx 4.4\times10^7 s^{-1} \text{ for } p=1\text{w·cm}^{-3} \quad (22)$$

Estimation of Cherenkov Light Intensity in a Spent Fuel Pool

Gamma radiation in spent fuel is mainly generated from the decay of fission products. $^{137}$Cs decays with a half-life of about 30 years. Due to its long half-life, $^{137}$Cs is the major contribution of radioactivity in the spent fuel pool after a fuel is being stored for several years. The gamma ray from Cs-137 has a peak at $E_\gamma$=662 keV. At this energy, the total incoherent cross section in water is [20]:

$$\sigma=0.09 \text{ cm}^2/\text{g} \quad (23)$$

Using Equation (10), about half of Compton electrons have energy higher that the threshold energy (0.26 MeV for index of refraction at 1.34) to produce Cherenkov light. To describe this effect, introduce an energy threshold factor for the following calculation:

$$f_{Th}=0.5 \quad (24)$$

When electron energy is below 1 MeV, $\sin^2 \theta_c$ changes dramatically, as shown in FIG. 10. The average value of $\sin^2 \theta_c$ is calculated by integrating Equations (6) and (10) over electron energy:

$$\overline{\sin^2 \theta_c} = \frac{\int_{E_{min}}^{E_{max}} \sin^2 \theta_c \frac{d\sigma}{dE_\beta} dE_\beta}{\int_{E_{min}}^{E_{max}} \frac{d\sigma}{dE_\beta} dE_\beta} = 0.16 \quad (25)$$

in which $E_{min}$ is the threshold energy to generate Cherenkov light, $E_m$ is the maximum Compton electron energy $$E_{max} = E_\gamma \frac{2E_\gamma}{m_e c^2 + 2E_\gamma} \quad (26)$$

Using Equation (17), the number of Cherenkov photons generated in the same radiator as mentioned in the previous section would be $$N = \frac{dN}{dx} D \cdot N_\beta V = (550 \sin^2 \theta_c \cdot D) \times (\sigma\rho\phi_0 f_{Th} \cdot V) \quad (27)$$
$$= 2.9 \times 10^9 s^{-1}$$

The estimated detectable signal S in the PMT is:

$$S=NTf_{PMT}f_{dir}=3.5\times10^4 s^{-1} \quad (28)$$

at gamma flux $\phi_0=10^{10}$ cm$^{-2}$s$^{-1}$, with gamma energy $E_\gamma$=0.62 MeV Defining a base dose rate of 1 Gy/h, the corresponding gamma flux is converted using the conversion factor suggested in (S.-G. Kwon, K.-E. Kim, C.-W. Ha, P. S. Moon, and C.-C. Yook, Journal of the Korean Nuclear Society 12, (1980). For gamma energy at 0.62 MeV, the flux equivalent is:

$$\phi_{1Gy}=7\times10^7 \text{ photons cm}^{-2}s^{-1} \quad (29)$$

Combing Equations (28) and (29), for 1 Gy/h gamma dose rate, the estimated detectable signal in PMT is:

$$S = \frac{\phi_{1Gy}}{\phi_0} = 3.5\times10^4 s^{-1} = 2.5 \times 10^2 s^{-1} \quad (30)$$

We give a few examples for estimated signal using this method to monitor the gamma radiation in spent fuel assemblies. The gamma dose rate at IRT-2M spent fuel assemblies was measured to be within 25 Gy/h, depending on the position of the measurement (Z. L. L. Viererbl, Nucl. Instrum. Methods Phys. Res., Sect. A 652, 90 (2011). The estimated signal rate would be around $6.2\times10^3 s^{-1}$. Measurements at a VVER 440 type nuclear power plant in Paks reported 0.1-10 kGy/h gamma dose rates in the spent fuel assemblies C. T. N. L. Lakosi, Nucl. Instrum. Methods Phys. Res., Sect. A 580, 788 (2007), which will give about signal rate of $2.5\times10^4$-$2.5\times10^6$ s$^{-1}$.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An apparatus for use in making passive measurements of electromagnetic radiation emitted from an object located in a radioactive environment bounded by a radiation barrier, the apparatus comprising:
   a hollow, elongate conduit having a first end extending along a linear first conduit axis, a second end, and a reflective inner surface and extending through the radiation barrier;
   the first end of the conduit being positioned on one side of the radiation barrier and within the radioactive environment proximate the object,
   the second end of the conduit being positioned on an opposing second side of the radiation barrier and outside the radioactive environment,
   the conduit having at least one offset portion located between the first end and the second end and configured such that first conduit axis intersects the inner surface of the conduit at the offset portion whereby light entering the first end of the conduit is reflected exclusively by the inner surface of the conduit as it travels through the conduit before reaching the second end and streaming of ionizing radiation particles through the conduit from the first end to the second end is inhibited, and at least one of the first and second ends of the conduit being open; and a detector in optical communication with the second end of the conduit and configured to detect the electromagnetic radiation exiting the second end.

2. The apparatus of claim 1, wherein the inner surface of the conduit has a reflectivity of at least 0.85.

3. The apparatus of claim 1, wherein the inner surface of the conduit has a surface roughness of 15 μin Ra or less.

4. The apparatus of claim 1, wherein the conduit is formed from one of metal, and a non-metallic material, and the inner surface comprises a metallic material that has been applied to the non-metallic material.

5. The apparatus of claim 1, wherein the conduit has an inner diameter that is less than 10 mm.

6. The apparatus of claim 1, wherein the at least one offset portion is positioned either between the first end of the conduit and the radiation barrier, or within the radiation barrier.

7. The apparatus of claim 1, wherein the detector comprises a photomultiplier tube.

8. The apparatus of claim 1, wherein the detector is in optical communication with the second end of the conduit via at least one of a fiber optic cable and a mirror.

9. The apparatus of claim 1, further comprising a gas source in fluid communication with the conduit and operable to introduce and remove gas from the hollow interior of the conduit, and wherein the gas source is operable to introduce at least one of Helium and Carbon Dioxide to the hollow interior of the conduit.

10. The apparatus of claim 1, wherein the detector is configured to detect Cherenkov light.

11. The apparatus of claim 1, wherein the object comprises a scintillator.

12. The apparatus of claim 1, wherein the hollow elongate conduit is provided with no separate reflecting elements.

13. A method for making localized passive measurements of electromagnetic radiation emitted from an object located in a radioactive environment, the method comprising:

a) providing a hollow elongate conduit having a first end, a second end, a reflective inner surface, and at least one bend between the first end and the second end, such that light entering the first end of the conduit is reflected exclusively by the inner surface of the conduit as it travels through the conduit before reaching the second end, at least one of the first and second ends of the conduit being open;

b) positioning the first end of the conduit in the radioactive environment proximate the object;

c) positioning the second end of the conduit outside the radioactive environment, d) providing a detector in optical communication with the second end of the conduit; and e) detecting electromagnetic radiation emitted from the object that reaches the second end of the conduit.

14. The method of claim 13, wherein the detected electromagnetic radiation comprises Cherenkov light, and wherein the object is immersed in a fluid, wherein positioning the first end of the conduit in the radioactive environment proximate the object comprises positioning the first end of the conduit in the fluid, and wherein the method further comprises:

providing a gas source in fluid communication with the conduit and operable to introduce and remove gas from the hollow interior of the conduit; and operating the gas source to adjust the volume of gas within the conduit in order to control the level of fluid in the conduit.

15. The method of claim 13, wherein the object comprises a scintillator.

16. The method of claim 13, wherein the detector comprises a photomultiplier tube.

17. The method of claim 13, wherein the inner surface of the conduit has a reflectivity of at least 0.85.

18. The method of claim 13, wherein the inner surface of the conduit has a surface roughness of 15 μin Ra or less.

19. The method of claim 13, wherein the hollow elongate conduit is provided with no separate reflecting elements.

* * * * *